(12) United States Patent
Thakkar et al.

(10) Patent No.: US 11,418,411 B1
(45) Date of Patent: Aug. 16, 2022

(54) DATA CENTER ISSUE RESOLUTION PRIORITIZATION

(71) Applicant: Dell Products L.P., Round Rock, TX (US)

(72) Inventors: Bina K. Thakkar, Cary, NC (US); Deepak NagarajeGowda, Cary, NC (US); Ashutosh P. Nanekar, Cary, NC (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/510,466

(22) Filed: Oct. 26, 2021

(51) Int. Cl.
*H04L 41/50* (2022.01)
*H04L 41/142* (2022.01)

(52) U.S. Cl.
CPC ............ *H04L 41/50* (2013.01); *H04L 41/142* (2013.01)

(58) Field of Classification Search
CPC . H04L 41/22; H04L 41/5032; H04L 41/5009; H04L 43/045; H04L 43/16; H04L 29/08072; H04L 43/04; H04L 41/0213; H04L 67/16; H04L 67/10; H04L 41/0806; H04L 41/5035; H04L 41/5038; H04L 67/02; H04L 41/5045; H04L 69/329; H04L 41/0686; H04L 41/069; H04L 43/0817; H04L 63/1425; H04L 41/5012; H04L 41/0681; H04L 63/1416; H04L 41/0813; H04L 43/06; H04L 67/1097; H04L 67/12; H04L 1/0002; H04L 1/0041; H04L 1/18; H04L 5/0064; H04L 1/0009; H04L 1/1874; H04L 67/306; H04L 47/122; H04L 29/00; H04L 67/2842; H04L 12/66; H04L 63/0227; H04L 1/0076; H04L 1/0057; H04L 1/1854; H04L 47/25; H04L 65/608; H04L 67/28; H04L 67/2823; H04L 67/2857; H04L 67/2885; H04L 69/163; H04L 69/164; H04L 67/289; H04L 67/32; H04L 67/34; H04L 41/0816; H04L 41/042; H04L 41/082; H04L 41/12; H04L 41/20; (Continued)

(56) References Cited

U.S. PATENT DOCUMENTS

2014/0379895 A1* 12/2014 Jain ..................... H04L 41/0609 709/224
2015/0280969 A1* 10/2015 Gates .................. H04L 41/0631 714/37
2018/0143856 A1* 5/2018 Du ........................ G06F 9/4881

(Continued)

*Primary Examiner* — Djenane M Bayard
(74) *Attorney, Agent, or Firm* — Terrile, Cannatti & Chambers; Stephen A. Terrile

(57) ABSTRACT

A system, method, and computer-readable medium are disclosed for performing a data center monitoring and management operation. The data center monitoring and management operation includes: monitoring a plurality of data center assets contained within a data center; identifying a plurality of data center issues based upon the monitoring; performing a data center issue grooming operation, the data center issue grooming operation identifying a number of data center issues from the plurality of data center issues; and performing a data center issue prioritization operation, the data center issue prioritization operation prioritizing the number of data center issues from the plurality of data center issues, the prioritizing being for at least one of resolution and remediation.

17 Claims, 12 Drawing Sheets

(58) Field of Classification Search
CPC ....... H04L 63/10; H04L 63/105; H04L 63/20; H04L 67/1002
See application file for complete search history.

(56) References Cited

U.S. PATENT DOCUMENTS

2019/0379576 A1* 12/2019 Narnakaje Venugopala ............... H04L 41/5009
2020/0322432 A1* 10/2020 Ghatak ................... H04L 67/10

* cited by examiner

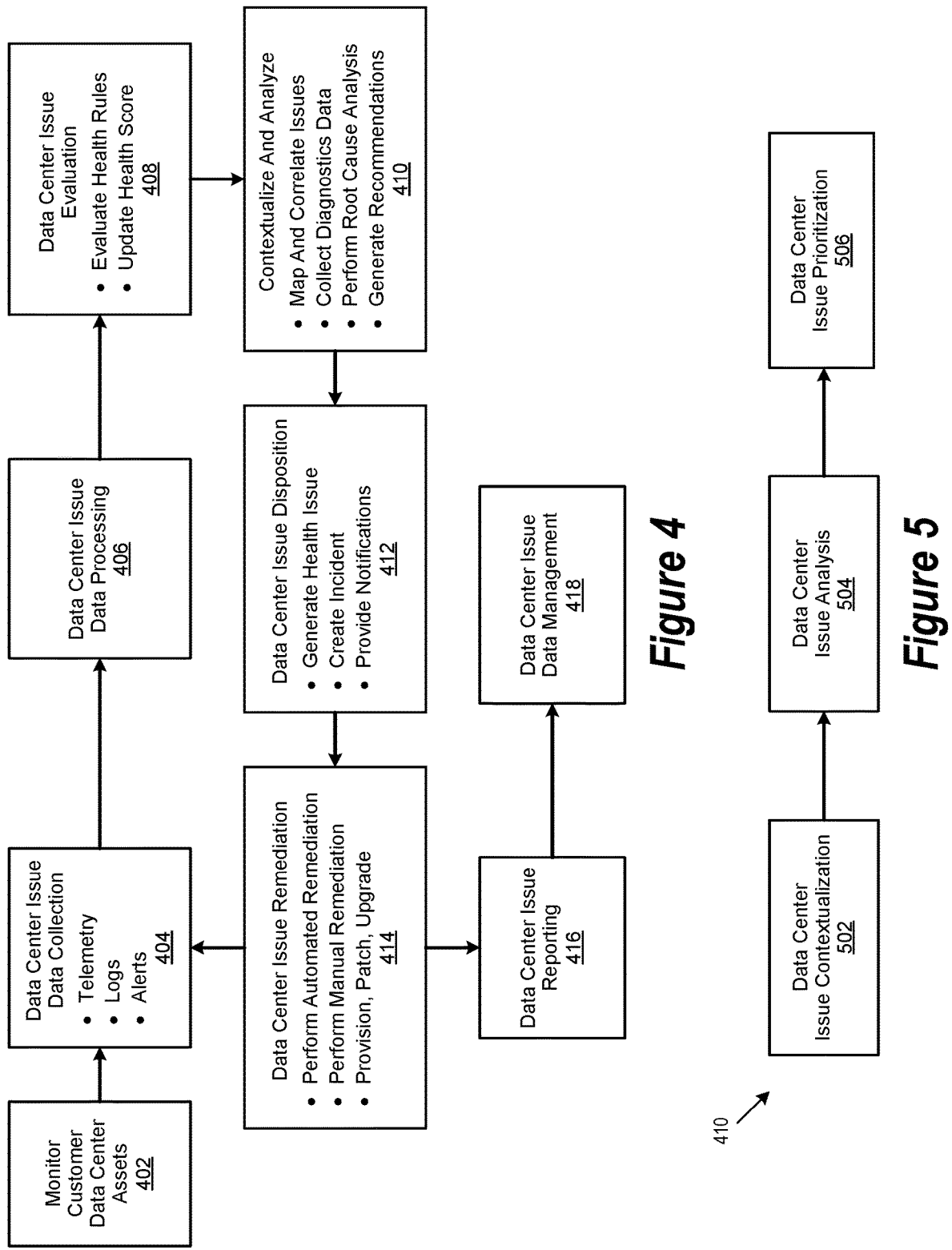

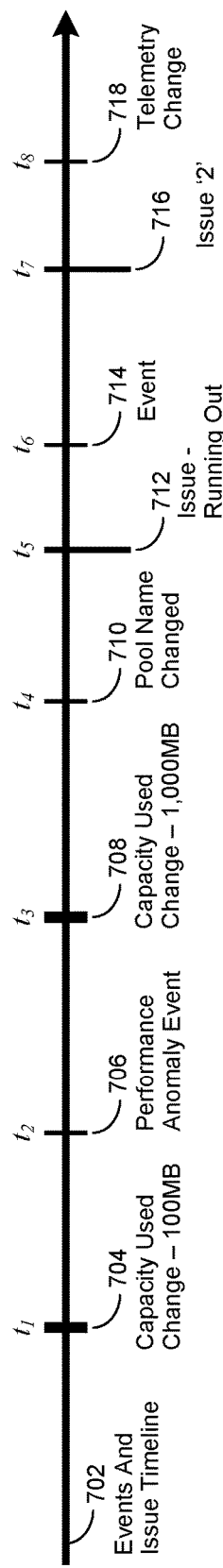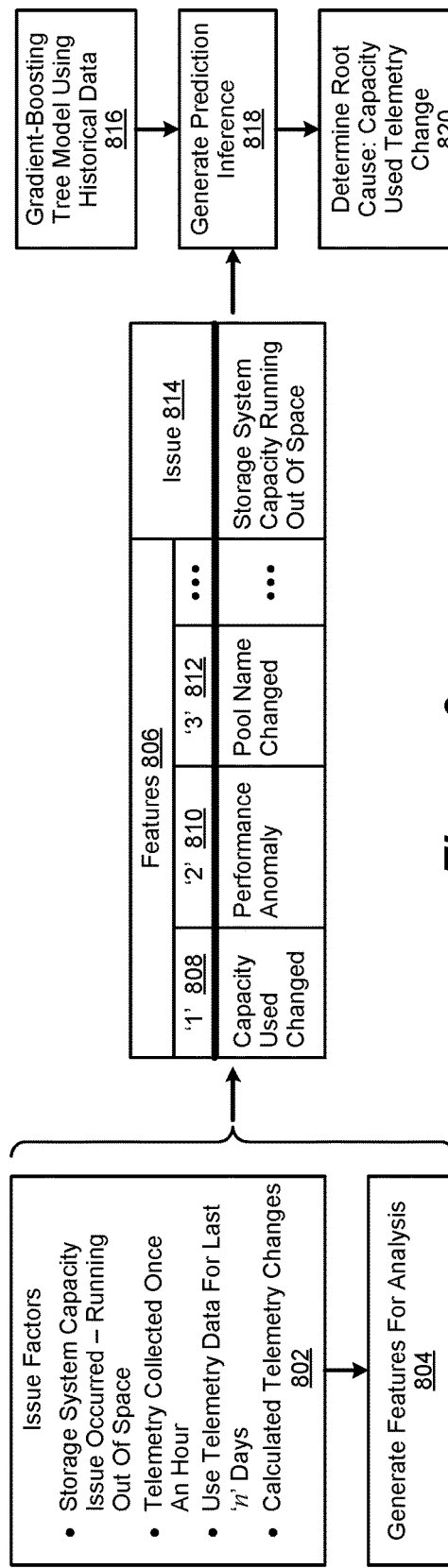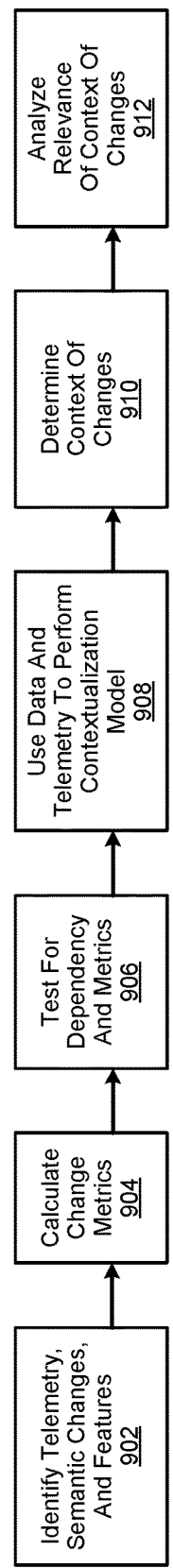

DATA CENTER ISSUE RESOLUTION PRIORITIZATION

BACKGROUND OF THE INVENTION

Field of the Invention

The present invention relates to information handling systems. More specifically, embodiments of the invention relate to performing a data center system monitoring and management operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for performing a data center monitoring and management operation, comprising: monitoring a plurality of data center assets contained within a data center; identifying a plurality of data center issues based upon the monitoring; performing a data center issue grooming operation, the data center issue grooming operation identifying a number of data center issues from the plurality of data center issues; and performing a data center issue prioritization operation, the data center issue prioritization operation prioritizing the number of data center issues from the plurality of data center issues, the prioritizing being for at least one of resolution and remediation.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: monitoring a plurality of data center assets contained within a data center; identifying a plurality of data center issues based upon the monitoring; performing a data center issue grooming operation, the data center issue grooming operation identifying a number of data center issues from the plurality of data center issues; and performing a data center issue prioritization operation, the data center issue prioritization operation prioritizing the number of data center issues from the plurality of data center issues, the prioritizing being for at least one of resolution and remediation.

In another embodiment the invention relates to a computer-readable storage medium embodying computer program code, the computer program code comprising computer executable instructions configured for: monitoring a plurality of data center assets contained within a data center; identifying a plurality of data center issues based upon the monitoring; performing a data center issue grooming operation, the data center issue grooming operation identifying a number of data center issues from the plurality of data center issues; and performing a data center issue prioritization operation, the data center issue prioritization operation prioritizing the number of data center issues from the plurality of data center issues, the prioritizing being for at least one of resolution and remediation.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 4 shows a simplified process flow of the performance of certain data center monitoring and management operations;

FIG. 5 shows a simplified process flow of the performance of data center issue contextualization, analysis, and prioritization operations;

FIG. 7 is a timeline showing the occurrence of certain example data center events and issues;

FIG. 8 shows a simplified process flow of the performance of data center issue contextualization operations to determine the root causality of a data center issue;

FIG. 9 shows a simplified process flow of the performance of data center issue contextualization operations to determine the context of a data center issue;

DETAILED DESCRIPTION

Figure 1:
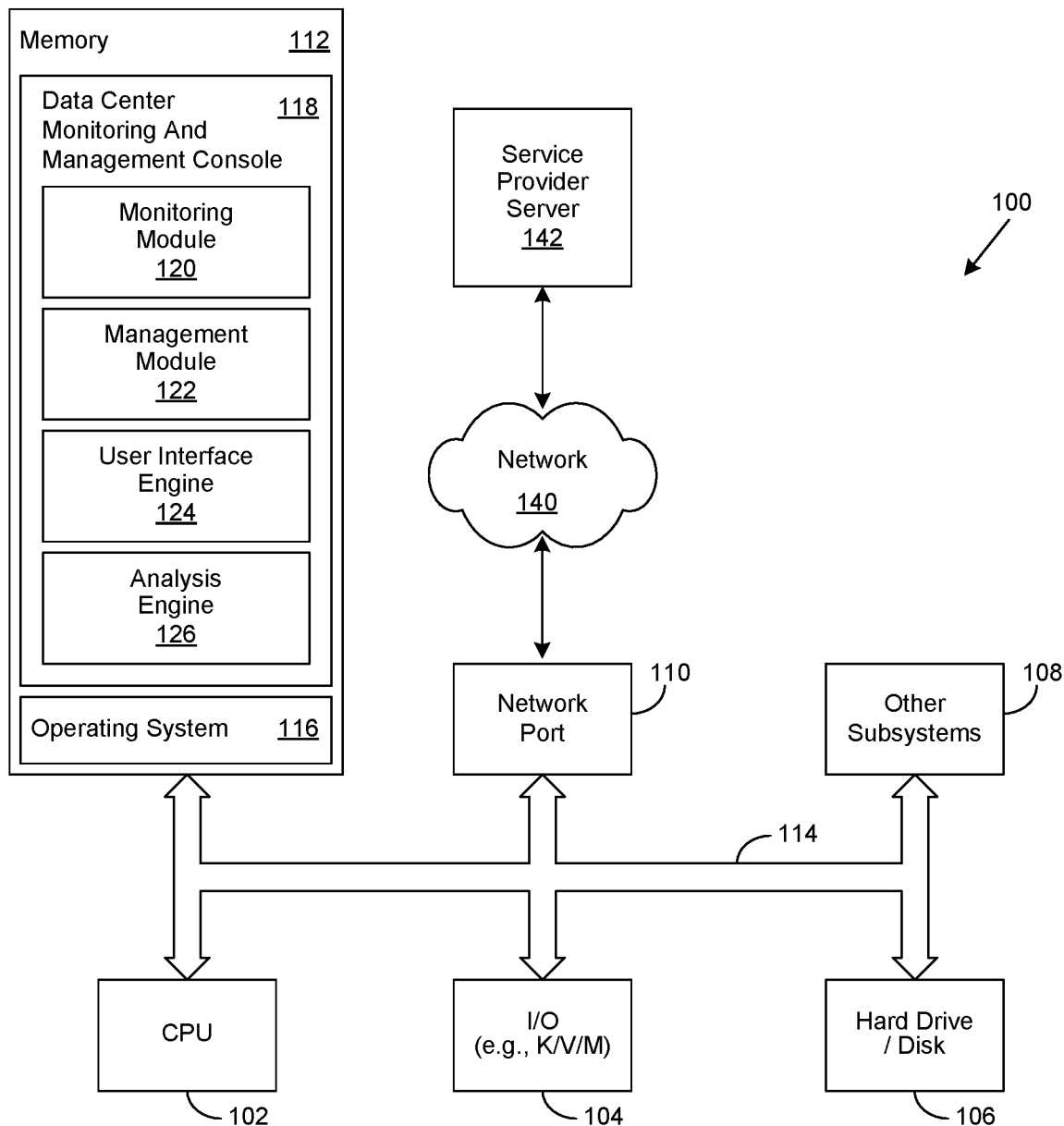
FIG. 1 shows a general illustration of components of an information handling system as implemented in the system and method of the present invention.

A system, method, and computer-readable medium are disclosed for performing a data center system monitoring and management operation. Various aspects of the invention reflect an appreciation that it is common for a typical datacenter to monitor and manage many different assets, such as certain computing and networking devices, described in greater detail herein. Certain aspects of the invention likewise reflect an appreciation that such data center assets are typically implemented to work in combination with one another for a particular purpose. Likewise, various aspects of the invention reflect an appreciation that such purposes generally involve the performance of a wide variety of tasks, operations, and processes to service certain workloads.

Certain aspects of the invention reflect an appreciation the emerging discipline of artificial intelligence (AI) operations (Ops) combines big data and machine learning approaches to automate information technology (IT) operations processes, including data center event correlation, anomaly detection and causality determination. Certain aspects of the invention likewise reflect an appreciation that contextualization is an important facet of AI Ops, as its success is often based upon the availability of sufficient contextualized data. Likewise, various aspects of the invention reflect an appreciation that such contextualization may be oriented to certain data center assets, their physical and logical topology, the occurrence of related events and corresponding telemetry, and associated business information. Various aspects of the invention likewise reflect an appreciation of the criticality of the ability to not only track and understand changes in a data center assets telemetry, but to understand their semantic meaning as they occur.

Various aspects of the invention reflect an appreciation that it can often be challenging to analyze and assess the impact of a particular data center issue. For example, what other data center assets may have been affected and what type of service degradation may result? Likewise, what is the business impact of a particular data center issue? Certain aspects of the invention likewise reflect an appreciation that data center issues, whether they are minor or severe, often occur on a frequent basis. Furthermore, the larger the data center, the larger the number of data center issues there are to resolve or remediate. Accordingly, certain aspects of the invention reflect an appreciation that the ability to prioritize a data center issue for resolution or remediation according to its severity, its operational criticality, or business impact, or a combination thereof, would be of value.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a data center monitoring and management console 118. In one embodiment, the information handling system 100 is able to download the data center monitoring and management console 118 from the service provider server 142. In another embodiment, the data center monitoring and management console 118 is provided as a service from the service provider server 142.

In certain embodiments, the data center monitoring and management console 118 may include a monitoring module 120, a management module 122, a user interface engine 124, and an analysis engine 126, or a combination thereof. In certain embodiments, the data center monitoring and management console 118 may be implemented to perform a data center monitoring and management operation. In certain embodiments, the data center monitoring and management operation may be performed during operation of an information handling system 100. In various embodiments, performance of the data center monitoring and management operation may result in the realization of improved monitoring and management of certain data center assets, as described in greater detail herein.

Figure 2:
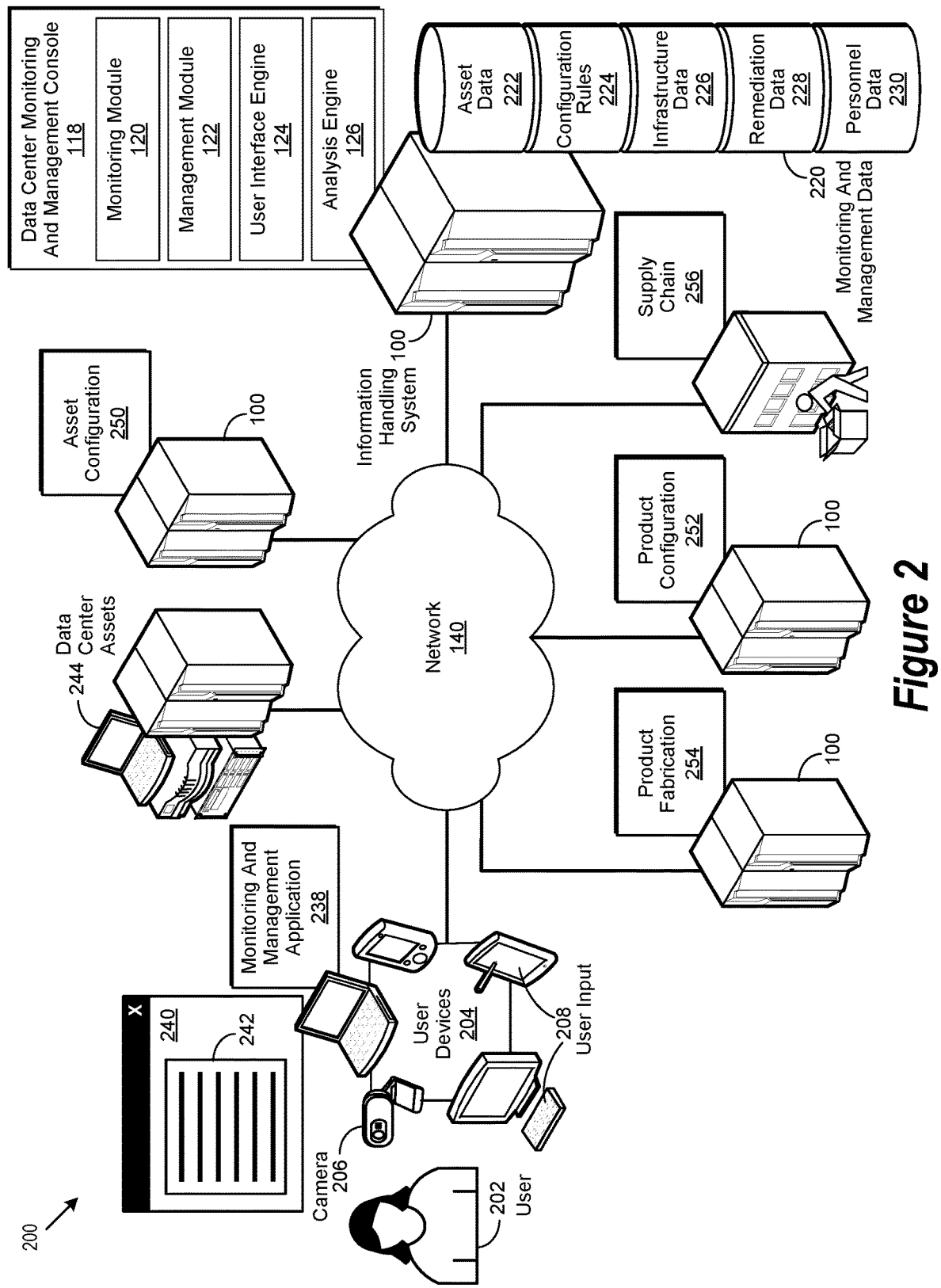
FIG. 2 shows a block diagram of a data center system monitoring and management environment.

FIG. 2 is a simplified block diagram of a data center monitoring and management environment implemented in accordance with an embodiment of the invention. As used herein, a data center broadly refers to a building, a dedicated space within a building, or a group of buildings, used to house a collection of interrelated data center assets 244 implemented to work in combination with one another for a particular purpose. As likewise used herein, a data center asset 244 broadly refers to anything tangible, or intangible, that can be owned, controlled, or enabled to produce value as a result of its use within a data center. In certain embodiments, a data center asset 244 may include a product, or a service, or a combination of the two.

As used herein, a tangible data center asset 244 broadly refers to data center asset 244 having a physical substance, such as a computing or network device. Examples of computing devices may include personal computers (PCs), laptop PCs, tablet computers, servers, mainframe computers, Redundant Arrays of Independent Disks (RAID) storage units, their associated internal and external components, and so forth. Likewise, examples of network devices may include routers, switches, hubs, repeaters, bridges, gateways, and so forth. Other examples of a tangible data center asset 244 may include certain data center personnel, such as a data center system administrator, operator, or technician, and so forth. Other examples of a tangible data center asset 244 may include certain maintenance, repair, and operations (MRO) items, such as replacement and upgrade parts for a particular data center asset 244. In certain embodiments, such MRO items may be in the form of consumables, such as air filters, fuses, fasteners, and so forth.

As likewise used herein, an intangible data center asset 244 broadly refers to a data center asset 244 that lacks physical substance. Examples of intangible data center assets 244 may include software applications, software services, firmware code, and other non-physical, computer-based assets. Other examples of intangible data center assets 244 may include digital assets, such as structured and unstructured data of all kinds, still images, video images, audio recordings of speech, and other sounds, and so forth. Further examples of intangible data center assets 244 may include intellectual property, such as patents, trademarks, copyrights, trade names, franchises, goodwill, and knowledge resources, such as data center asset 244 documentation. Yet other examples of intangible data center assets 244 may include certain tasks, functions, operations, procedures, or processes performed by data center personnel. Those of skill in the art will recognize that many such examples of tangible and intangible data center assets 244 are possible. Accordingly, the foregoing is not intended to limit the spirit, scope or intent of the invention.

In certain embodiments, the value produced by a data center asset 244 may be tangible or intangible. As used herein, tangible value broadly refers to value that can be measured. Examples of tangible value may include return on investment (ROI), total cost of ownership (TCO), internal rate of return (IRR), increased performance, more efficient use of resources, improvement in sales, decreased customer support costs, and so forth. As likewise used herein, intangible value broadly refers to value that provides a benefit that may be difficult to measure. Examples of intangible value may include improvements in user experience, customer support, and market perception. Skilled practitioner of the art will recognize that many such examples of tangible and intangible value are possible. Accordingly, the foregoing is not intended to limit the spirit, scope or intent of the invention.

In certain embodiments, the data center monitoring and management environment 200 may include a data center monitoring and management console 118. In certain embodiments, the data center monitoring and management console 118 may be implemented to perform a data center monitoring and management operation. As used herein, a data center monitoring and management operation broadly refers to any task, function, procedure, or process performed, directly or indirectly, within a data center monitoring and management environment 200 to procure, deploy, configure, implement, operate, monitor, manage, maintain, or remediate a data center asset 244.

In certain embodiments, a data center monitoring and management operation may include a data center monitoring task. As used herein, a data center monitoring task broadly refers to any function, operation, procedure, or process performed, directly or indirectly, within a data center monitoring and management environment 200 to monitor the operational status of a particular data center asset 244. In various embodiments, a particular data center asset 244 may be implemented to generate an alert if its operational status exceeds certain parameters. In these embodiments, the definition of such parameters, and the method by which they may be selected, is a matter of design choice.

For example, an internal cooling fan of a server may begin to fail, which in turn may cause the operational temperature of the server to exceed its rated level. In this example, the server may be implemented to generate an alert, which provides notification of the occurrence of a data center issue. As used herein, a data center issue broadly refers to an operational situation associated with a particular component of a data monitoring and management environment 200, which if not corrected, may result in negative consequences. In certain embodiments, a data center issue may be related to the occurrence, or predicted occurrence, of an anomaly within the data center monitoring and management environment 200. In certain embodiments, the anomaly may be related to unusual or unexpected behavior of one or more data center assets 244.

In certain embodiments, a data center monitoring and management operation may include a data center management task. As used herein, a data center management task broadly refers to any function, operation, procedure, or process performed, directly or indirectly, within a data center monitoring and management environment 200 to manage a particular data center asset 244. In certain embodiments, a data center management task may include a data center deployment operation, a data center remediation operation, a data center remediation documentation operation, or a combination thereof.

As used herein, a data center deployment operation broadly refers to any function, task, procedure, or process performed, directly or indirectly, within a data center monitoring and management environment 200 to install a software file, such as a configuration file, a new software application, a version of an operating system, and so forth, on a data center asset 244. As likewise used herein, a data center remediation operation broadly refers to any function, task, procedure, or process performed, directly or indirectly, within a data center monitoring and management environment 200 to correct an operational situation associated with a component of a data monitoring and management environment 200, which if not corrected, may result in negative consequences. A data center remediation documentation operation, as likewise used herein, broadly refers to any function, task, procedure, or process performed, directly or indirectly, within a data center monitoring and management environment 200 to retrieve, generate, revise, update, or store remediation documentation that may be used in the performance of a data center remediation operation.

In certain embodiments, the data center monitoring and management console 118 may be implemented to receive an alert corresponding to a particular data center issue. In various embodiments, the data center monitoring and management console 118 may be implemented to receive certain data associated with the operation of a particular data center asset 244. In certain embodiments, such operational data may be received through the use of telemetry approaches familiar to those of skill in the art. In various embodiments, the data center monitoring console 118 may be implemented to process certain operational data received from a particular data center asset to determine whether a data center issue has occurred, is occurring, or is anticipated to occur.

In certain embodiments, the data center monitoring and management console 118 may be implemented to include a monitoring module 120, a management monitor 122, a user interface (UI) engine 124, and an analysis engine 126, or a combination thereof. In certain embodiments, the monitoring module 120 may be implemented to monitor the procurement, deployment, implementation, operation, management, maintenance, or remediation of a particular data center asset 244 at any point in its lifecycle. In certain embodiments, the management module 122 may be implemented to manage the procurement, deployment, implementation, operation, monitoring, maintenance, or remediation of a particular data center asset 244 at any point in its lifecycle.

In various embodiments, the UI engine 124 may be implemented to generate a UI for the provision, or receipt, of certain information associated with the monitoring, or management, of a particular data center asset 244. In certain embodiments, a data center monitoring and management operation may include a data center issue contextualization operation, a data center issue analysis operation, or a data center issue prioritization operation, or a combination thereof, as described in greater detail herein. In various embodiments, the monitoring module 120, the management module 122, the UI engine 124, and the analysis engine 126 may be implemented, individually or in combination with one another to perform a data center issue contextualization operation, a data center issue analysis operation, or a data center issue prioritization operation, or a combination thereof, as likewise described in greater detail herein.

In certain embodiments, the data center monitoring and management environment 200 may include a repository of data center monitoring and management data 220. In certain embodiments, the repository of data center monitoring and management data 220 may be local to the information handling system 100 executing the data center monitoring and management console 118 or may be located remotely. In various embodiments, the repository of data center monitoring and management data 220 may include certain information associated with data center asset data 222, data center asset configuration rules 224, data center infrastructure data 226, data center remediation data 228, and data center personnel data 230.

As used herein, data center asset data 222 broadly refers to information associated with a particular data center asset 244, such as an information handling system 100, or an associated workload, that can be read, measured, and structured into a usable format. For example, data center asset data 222 associated with a particular server may include the number and type of processors it can support, their speed and architecture, minimum and maximum amounts of memory supported, various storage configurations, the number, type, and speed of input/output channels and ports, and so forth. In various embodiments, the data center asset data 222 may likewise include certain performance and configuration information associated with a particular workload, as described in greater detail herein. In various embodiments, the data center asset data 222 may include certain public or proprietary information related to data center asset 244 configurations associated with a particular workload.

In certain embodiments, the data center asset data 222 may include information associated with data center asset 244 types, quantities, locations, use types, optimization types, workloads, performance, support information, and cost factors, or a combination thereof, as described in greater detail herein. In certain embodiments, the data center asset data 222 may include information associated with data center asset 244 utilization patterns, likewise described in greater detail herein. In certain embodiments, the data center asset data 222 may include information associated with the allocation of certain data center asset resources, described in greater detail herein, to a particular workload.

As likewise used herein, a data center asset configuration rule 224 broadly refers to a rule used to configure a particular data center asset 244. In certain embodiments, one or more data center asset configuration rules 224 may be used to verify that a particular data center asset 244 configuration is the most optimal for an associated location, or workload, or to interact with other data center assets 244, or a combination thereof, as described in greater detail herein. In certain embodiments, the data center asset configuration rule 224 may be used in the performance of a data center asset configuration verification operation, a data center remediation operation, or a combination of the two. In certain embodiments, the data center asset configuration verification operation, or the data center remediation operation, or both, may be performed by an asset configuration system 250. In certain embodiments, the asset configuration system 250 may be used in combination with the data center monitoring and management console 118 to perform a data center asset configuration operation, or a data center remediation operation, or a combination of the two.

As used herein, data center infrastructure 226 data broadly refers to any data associated with a data center infrastructure component. As likewise used herein, a data center infrastructure component broadly refers to any component of a data center monitoring and management environment 200 that may be involved, directly or indirectly, in the procurement, deployment, implementation, configuration, operation, monitoring, management, maintenance, or remediation of a particular data center asset 244. In certain embodiments, data center infrastructure components may include physical structures, such as buildings, equipment racks and enclosures, network and electrical cabling, heating, cooling, and ventilation (HVAC) equipment and associated ductwork, electrical transformers and power conditioning systems, water pumps and piping systems, smoke and fire suppression systems, physical security systems and associated peripherals, and so forth. In various embodiments, data center infrastructure components may likewise include the provision of certain services, such as network connectivity, conditioned airflow, electrical power, and water, or a combination thereof.

Data center remediation data 228, as used herein, broadly refers to any data associated with the performance of a data center remediation operation, described in greater details herein. In certain embodiments, the data center remediation data 228 may include information associated with the remediation of a particular data center issue, such as the date and time an alert was received indicating the occurrence of the data center issue. In certain embodiments, the data center remediation data 228 may likewise include the amount of elapsed time before a corresponding data center remediation operation was begun after receiving the alert, and the amount of elapsed time before it was completed. In various embodiments, the data center remediation data 228 may include information related to certain data center issues, the frequency of their occurrence, their respective causes, error codes associated with such data center issues, the respective location of each data center asset 244 associated with such data center issues, and so forth.

In various embodiments, the data center remediation data 228 may include information associated with data center asset 244 replacement parts, or upgrades, or certain third party services that may need to be procured in order to perform the data center remediation operation. Likewise, in certain embodiments, related data center remediation data 228 may include the amount of elapsed time before the replacement parts, or data center asset 244 upgrades, or third party services were received and implemented. In certain embodiments, the data center remediation data 228 may include information associated with data center personnel who may have performed a particular data center remediation operation. Likewise, in certain embodiments, related data center remediation data 228 may include the amount of time the data center personnel actually spent performing the operation, issues encountered in performing the operation, and the eventual outcome of the operation that was performed.

In certain embodiments, the data center remediation data 228 may include remediation documentation associated with a particular data center asset 244. In various embodiments, such remediation documentation may include information associated with certain attributes, features, characteristics, functional capabilities, operational parameters, and so forth, of a particular data center asset 244. In certain embodiments, such remediation documentation may likewise include information, such as step-by-step procedures and associated instructions, video tutorials, diagnostic routines and tests, checklists, and so forth, associated with remediating a particular data center issue.

In certain embodiments, the data center remediation data 228 may include information associated with any related remediation dependencies, such as other data center remediation operations that may need to be performed beforehand. In certain embodiments, the data center remediation data 228 may include certain time restrictions when a data center remediation operation, such as rebooting a particular server, may be performed. In various embodiments, the data center remediation data 228 may likewise include certain autonomous remediation rules, described in greater detail herein. In various embodiments, certain of these autonomous remediation rules may be used in the performance of an autonomous remediation operation, described in greater detail herein. Those of skill in the art will recognize that many such examples of data center remediation data 228 are possible. Accordingly, the foregoing is not intended to limit the spirit, scope, or intent of the invention.

Data center personnel data 230, as used herein, broadly refers to any data associated with data center personnel who may be directly, or indirectly, involved in the procurement, deployment, configuration, implementation, operation, monitoring, management, maintenance, or remediation of a particular data center asset 244. In various embodiments, the data center personnel data 230 may include job title, work assignment, or responsibility information corresponding to certain data center personnel. In various embodiments, the data center personnel data 230 may include information related to the type, and number, of data center remediation operations currently being, or previously, performed by certain data center personnel. In various embodiments, the data center personnel data 230 may include historical information, such as success metrics, associated with data center remediation operations performed by certain data center personnel, such as data center administrators, operators, and technicians. In these embodiments, the data center personnel data 230 may be updated as individual data center personnel complete each data center remediation task, described in greater detail herein, they are assigned.

In various embodiments, the data center personnel data 230 may likewise include education, certification, and skill level information corresponding to certain data center personnel. Likewise, in various embodiments, the data center personnel data 230 may include security-related information, such as security clearances, user IDs, passwords, security-related biometrics, authorizations, and so forth, corresponding to certain data center personnel. Those of skill in the art will recognize that many such examples of data center personnel data 230 are possible. Accordingly, the foregoing is not intended to limit the spirit, scope, or intent of the invention.

In certain embodiments, various data center assets 244 within a data center monitoring and management environment 200 may have certain interdependencies. As an example, a data center monitoring and management environment 200 may have multiple servers interconnected by a storage area network (SAN) providing block-level access to various disk arrays and tape libraries. In this example, the servers, various physical and operational elements of the SAN, as well the disk arrays and tape libraries, are interdependent upon one another.

In certain embodiments, each data center asset 244 in a data center monitoring and management environment 200 may be treated as a separate data center asset 244 and depreciated individually according to their respective attributes. As an example, a particular rack of servers in a data center monitoring and management environment 200 may be made up of a variety of individual servers, each of which may have a different depreciation schedule. To continue the example, certain of these data center assets 244 may be implemented in different combinations to produce an end result. To further illustrate the example, a particular server in the rack of servers may initially be implemented to query a database of customer records. As another example, the same server may be implemented at later time perform a sales analysis of sales associated with those same customer records.

In certain embodiments, each data center asset 244 in a data center monitoring and management environment 200 may have an associated maintenance schedule and service contract. For example, a data center monitoring and management environment 200 may include a wide variety of servers and storage arrays, which may respectively be manufactured by a variety of manufacturers. In this example, the frequency and nature of scheduled maintenance, as well as service contract terms and conditions, may be different for each server and storage array. In certain embodiments, the individual data center assets 244 in a data center monitoring and management environment 200 may be configured differently, according to their intended use. To continue the previous example, various servers may be configured with faster or additional processors for one intended workload, while other servers may be configured with additional memory for other intended workloads. Likewise, certain storage arrays may be configured as one RAID configuration, while others may be configured as a different RAID configuration.

In certain embodiments, the data center monitoring and management environment 200 may likewise be implemented to include an asset configuration system 250, a product configuration system 252, a product fabrication system 254, and a supply chain system 256, or a combination thereof. In various embodiments, the asset configuration system 250 may be implemented to perform certain data center asset 244 configuration operations. In certain embodiments, the data center asset 244 configuration operation may be performed to configure a particular data center asset 244 for a particular purpose. In certain embodiments, the data center monitoring and management console 118 may be implemented to interact with the asset configuration system 250 to perform a particular data center asset 244 configuration operation. In various embodiments, the asset configuration system 250 may be implemented to generate, manage, and provide, or some combination thereof, data center asset configuration rules 224. In certain of these embodiments, the data center asset configuration rules 224 may be used to configure a particular data center asset 244 for a particular purpose.

In certain embodiments, a user 202 may use a user device 204 to interact with the data center monitoring and management console 118. As used herein, a user device 204 refers to an information handling system such as a personal computer, a laptop computer, a tablet computer, a personal digital assistant (PDA), a smart phone, a mobile telephone, or other device that is capable of processing and communicating data. In certain embodiments, the communication of the data may take place in real-time or near-real-time. As used herein, real-time broadly refers to processing and providing information within a time interval brief enough to not be discernable by a user 202.

In certain embodiments, a user device 204 may be implemented with a camera 206, such as a video camera known to skilled practitioners of the art. In certain embodiments, the camera 206 may be integrated into the user device 204. In certain embodiments, the camera 206 may be implemented as a separate device configured to interoperate with the user device 204. As an example, a webcam familiar to those of skill in the art may be implemented receive and communicate various image and audio signals to a user device 204 via a Universal Serial Bus (USB) interface.

In certain embodiments, the user device 204 may be configured to present a data center monitoring and management console user interface (UI) 240. In certain embodiments, the data center monitoring and management console UI 240 may be implemented to present a graphical representation 242 of data center asset monitoring and management information, which is automatically generated in response to interaction with the data center monitoring and management console 118. In certain embodiments, the UI engine 124 may be implemented to generate the data center monitoring and management console UI 240, or the graphical representation 242 presented therein, or both.

In certain embodiments, a data center monitoring and management application 238 may be implemented on a particular user device 204. In various embodiments, the data center monitoring and management application 238 may be implemented on a mobile user device 204, such as a laptop computer, a tablet computer, a smart phone, a dedicated-purpose mobile device, and so forth. In certain of these embodiments, the mobile user device 204 may be used at various locations within the data center monitoring and management environment 200 by the user 202 when performing a data center monitoring and management operation, described in greater detail herein.

In various embodiments, the data center monitoring and management application 238 may be implemented to facilitate a user 202, such as a data center administrator, operator, or technician, to perform a particular data center remediation operation. In various embodiments, such facilitation may include using the data center monitoring and management application 238 to receive a notification of a data center remediation task, described in greater detail herein, being assigned to the user. In certain embodiments, the data center monitoring and management console 118 may be implemented to generate the notification of the data center remediation task assignment, and assign it to the user, as likewise described in greater detail herein. In certain embodiments, the data center monitoring and management console 118 may be implemented to generate the data center remediation task, and once generated, provide it to the data center monitoring and management application 238 associated with the assigned user 202.

In certain embodiments, such facilitation may include using the data center monitoring and management application 238 to receive the data center remediation task from the data center monitoring and management console 118. In various embodiments, such facilitation may include using the data center monitoring and management application 238 to confirm that the user 202 is at the correct physical location of a particular data center asset 244 associated with a corresponding data center issue. In certain of these embodiments, the data center monitoring and management application 238 may be implemented to include certain Global Positioning System (GPS) capabilities, familiar to those of skill in the art, which may be used to determine the physical location of the user 202 in relation to the physical location of a particular data center asset 244.

In various embodiments, such facilitation may include using the data center monitoring and management application 238 to ensure the user 202 is aware of, or is provided the location of, or receives, or a combination thereof, certain remediation resources, described in greater detail herein, that may be needed to perform a particular data center remediation operation. In various embodiments, such facilitation may include using the data center monitoring and management application 238 to view certain remediation documentation, or augmented instructions, related to performing a particular data center remediation operation. In various embodiments, such facilitation may include using the data center monitoring and management application 238 to certify that a particular data center remediation operation has been performed successfully.

In certain embodiments the UI window 240 may be implemented as a UI window of the data center monitoring and management application 238. In various embodiments, the data center monitoring and management application 238 may be implemented to include, in part or in whole, certain functionalities associated with the data center monitoring and management console 118. In certain embodiments, the data center monitoring and management application 238 may be implemented to interact in combination with the data center monitoring and management console 118, and other components of the data center monitoring and management environment 200, to perform a data center monitoring and management operation.

In certain embodiments, the user device 204 may be used to exchange information between the user 202 and the data center monitoring and management console 118, the data center monitoring and management application 238, the asset configuration system 250, the product configuration system 252, the product fabrication system 254, and the supply chain system 256, or a combination thereof, through the use of a network 140. In various embodiments, the asset configuration system 250 may be implemented to configure a particular data center asset 244 to meet certain performance goals. In various embodiments, the asset configuration system 250 may be implemented to use certain data center monitoring and management data 220, certain data center asset configuration rules 226 it may generate or manage, or a combination thereof, to perform such configurations.

In various embodiments, the product configuration system 252 may be implemented to use certain data center monitoring and management data 220 to optimally configure a particular data center asset 244, such as a server, for an intended workload. In various embodiments, the data center monitoring and management data 220 used by the product configuration system 252 may have been generated as a result of certain data center monitoring and management operations, described in greater detail herein, being performed by the data center monitoring and management console 118. In various embodiments, the product configuration system 252 may be implemented to provide certain product configuration information to a product fabrication system 254. In various embodiments, the product fabrication system 254 may be implemented to provide certain product fabrication information to a product fabrication environment (not shown). In certain embodiments, the product fabrication information may be used by the product fabrication environment to fabricate a product, such as a server, to match a particular data center asset 244 configuration.

In various embodiments, the data center monitoring and management console UI 240 may be presented via a website (not shown). In certain embodiments, the website may be provided by one or more of the data center monitoring and management console 118, the asset configuration system 250, the product configuration system 252, the product fabrication system 254, or the supply chain system 256. In certain embodiments, the supply chain system 256 may be implemented to manage the provision, fulfillment, or deployment of a particular data center asset 244 produced in the product fabrication environment. For the purposes of this disclosure a website may be defined as a collection of related web pages which are identified with a common domain name and is published on at least one web server. A website may be accessible via a public IP network or a private local network.

A web page is a document which is accessible via a browser which displays the web page via a display device of an information handling system. In various embodiments, the web page also includes the file which causes the document to be presented via the browser. In various embodiments, the web page may comprise a static web page, which is delivered exactly as stored and a dynamic web page, which is generated by a web application that is driven by software that enhances the web page via user input 208 to a web server.

In certain embodiments, the data center monitoring and management console 118 may be implemented to interact with the asset configuration system 250, the product configuration system 252, the product fabrication system 254, and the supply chain or fulfillment system 256, or a combination thereof, each of which in turn may be executing on a separate information handling system 100. In certain embodiments, the data center monitoring and management console 118 may be implemented to interact with the asset configuration system 250, the product configuration system 252, the product fabrication system 254, and the supply chain or fulfillment system 256, or a combination thereof, to perform a data center monitoring and management operation, as described in greater detail herein.

Figure 3:
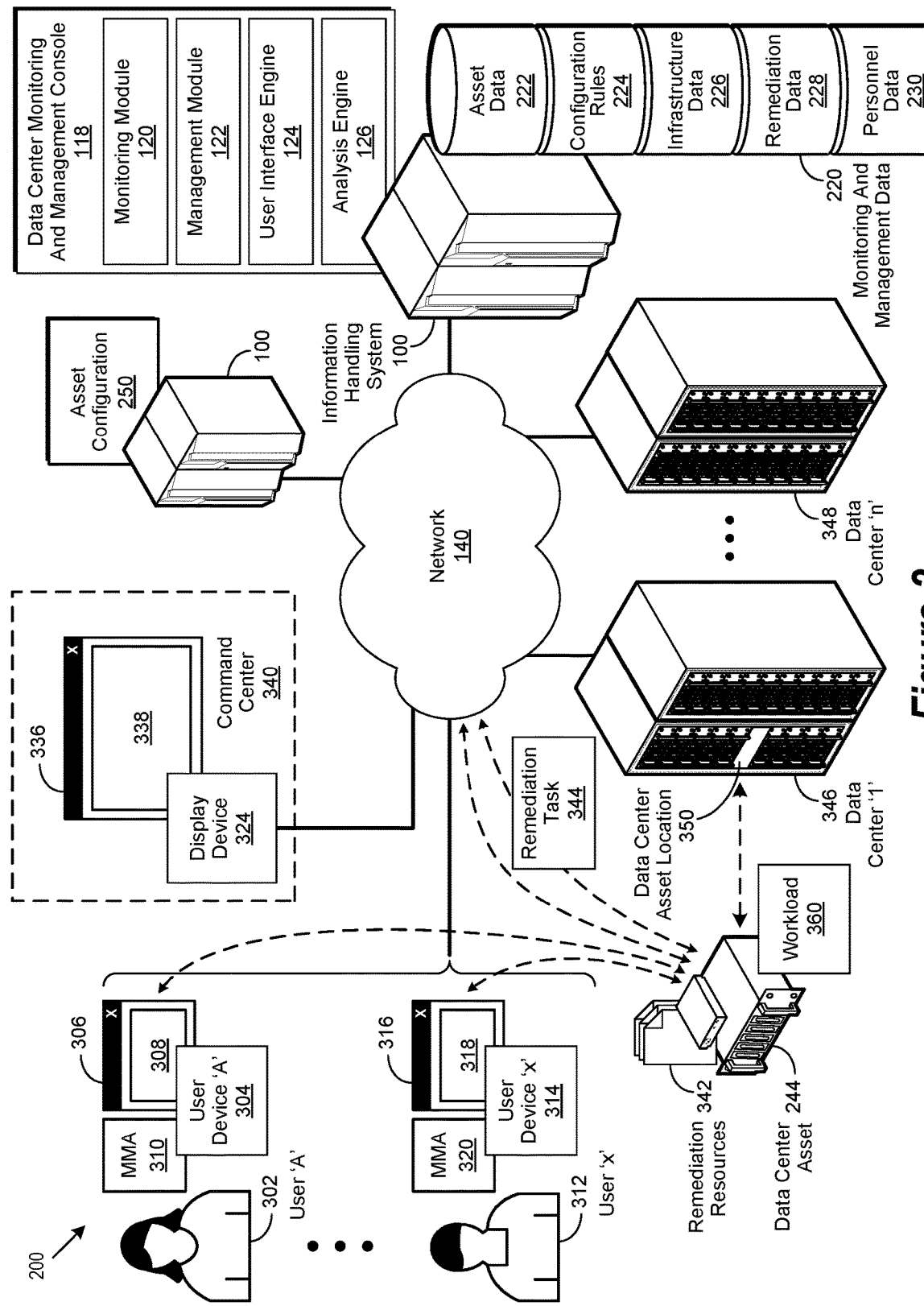
FIG. 3 shows a functional block diagram of the performance of certain data center monitoring and management operations.

FIG. 3 shows a functional block diagram of the performance of certain data center monitoring and management operations implemented in accordance with an embodiment of the invention. In various embodiments, a data center monitoring and management environment 200, described in greater detail herein, may be implemented to include one or more data centers, such as data centers '1' 346 through 'n' 348. As likewise described in greater detail herein, each of the data centers '1' 346 through 'n' 348 may be implemented to include one or more data center assets 244, likewise described in greater detail herein.

In certain embodiments, a data center asset 244 may be implemented to process an associated workload 360. A workload 360, as used herein, broadly refers to a measure of information processing that can be performed by one or more data center assets 244, individually or in combination with one another, within a data center monitoring and management environment 200. In certain embodiments, a workload 360 may be implemented to be processed in a virtual machine (VM) environment, familiar to skilled practitioners of the art. In various embodiments, a workload 360 may be implemented to be processed as a containerized workload 360, likewise familiar to those of skill in the art.

In certain embodiments, as described in greater detail herein, the data center monitoring and management environment 200 may be implemented to include a data center monitoring and management console 118. In certain embodiments, the data center monitoring and management console 118 may be implemented to include a monitoring module 120, a management module 122, a user interface (UI) engine 124, and an analysis engine 126, or a combination thereof, as described in greater detail herein.

As described in greater detail herein, the data center monitoring and management console 118 may be implemented in certain embodiments to perform a data center monitoring and management operation. In certain embodiments, the data center monitoring and management console 118 may be implemented to provide a unified framework for the performance of a plurality of data center monitoring and management operations, by a plurality of users, within a common user interface (UI). In certain embodiments, the data center monitoring and management console 118, and other components of the data center monitoring environment 200, such as the asset configuration system 250, may be implemented to be used by a plurality of users, such as users 'A' 302 through 'x' 312 shown in FIG. 3. In various embodiments, certain data center personnel, such as users 'A' 302 through 'x' 312, may respectively interact with the data center monitoring and management console 118, and other components of the data center monitoring and management environment 200, through the use of an associated user device 'A' 304 through 'x' 314.

In certain embodiments, such interactions may be respectively presented to users 'A' 302 through 'x' 312 within a user interface (UI) window 306 through 316, corresponding to user devices 'A' 304 through 'x' 314. In certain embodiments the UI window 306 through 316 may be implemented in a window of a web browser, familiar to skilled practitioners of the art. In certain embodiments, a data center monitoring and management application (MMA) 310 through 320, described in greater detail herein, may be respectively implemented on user devices 'A' 304 through 'x' 314. In certain embodiments the UI window 306 through 316 may be respectively implemented as a UI window of the data center MMA 310 through 320. In certain embodiments, the data center MMA 310 through 320 may be implemented to interact in combination with the data center monitoring and management console 118, and other components of the data center monitoring and management environment 200, to perform a data center monitoring and management operation.

In certain embodiments, the interactions with the data center monitoring and management console 118, and other components of the data center monitoring and management environment 200, may respectively be presented as a graphical representation 308 through 318 within UI windows 306 through 316. In various embodiments, such interactions may be presented to users 'A' 302 through 'x' 312 via a display device 324, such as a projector or large display screen. In certain of these embodiments, the interactions may be presented to users 'A' 302 through 'x' 312 as a graphical representation 338 within a UI window 336.

In certain embodiments, the display device 324 may be implemented in a command center 340, familiar to those of skill in the art, such as a command center 340 typically found in a data center or a network operations center (NOC). In various embodiments, one or more of the users 'A' 302 through 'x' 312 may be located within the command center 340. In certain of these embodiments, the display device 324 may be implemented to be generally viewable by one or more of the users 'A' 302 through 'x' 312.

In certain embodiments, the data center monitoring and management operation may be performed to identify the location 350 of a particular data center asset 244. In certain embodiments, the location 350 of a data center asset 244 may be physical, such as the physical address of its associated data center, a particular room in a building at the physical address, a particular location in an equipment rack in that room, and so forth. In certain embodiments, the location 350 of a data center asset 244 may be non-physical, such as a network address, a domain, a Uniform Resource Locator (URL), a file name in a directory, and so forth.

Certain embodiments of the invention reflect an appreciation that it is not uncommon for large organization to have one or more data centers, such as data centers '1' 346 through 'n' 348. Certain embodiments of the invention reflect an appreciation that it is likewise not uncommon for such data centers to have multiple data center system administrators and data center technicians. Likewise, various embodiments of the invention reflect an appreciation that it is common for a data center system administrator to be responsible for planning, initiating, and overseeing the execution of certain data center monitoring and management operations. Certain embodiments of the invention reflect an appreciation that it is common for a data center system administrator, such as user 'A' 302, to assign a particular data center monitoring and management operation to a data center technician, such as user 'x' 312, as a task to be executed.

Certain embodiments of the invention reflect an appreciation that it is likewise common for a data center administrator, such as user 'A' 302, to assume responsibility for performing a particular data center monitoring and management operation. As an example, a data center administrator may receive a stream of data center alerts, each of which is respectively associated with one or more data center issues. To continue the example, several of the alerts may have an initial priority classification of "critical." However, the administrator may notice that one such alert may be associated with a data center issue that is more critical, or time sensitive, than the others and should be remediated as quickly as possible. Accordingly, the data center administrator may elect to assume responsibility for remediating the data center issue, and as a result, proceed to perform an associated data center remediation operation at that time instead of assigning it to other data center personnel.

Certain embodiments of the invention reflect an appreciation that the number of data center assets 244 in a particular data center '1' 346 through 'n' 348 may be quite large. Furthermore, it is not unusual for such data center assets 244 to be procured, deployed, configured, and implemented on a scheduled, or as needed, basis. It is likewise common for certain existing data center assets 244 to be replaced, upgraded, reconfigured, maintained, or remediated on a scheduled, or as-needed, basis. Likewise, certain embodiments of the invention reflect an appreciation that such replacements, upgrades, reconfigurations, maintenance, or remediation may be oriented towards hardware, firmware, software, connectivity, or a combination thereof.

For example, a data center system administrator may be responsible for the creation of data center asset 244 procurement, deployment, configuration, and implementation templates, firmware update bundles, operating system (OS) and software application stacks, and so forth. Likewise, a data center technician may be responsible for receiving a procured data center asset 244, transporting it to a particular data asset location 350 in a particular data center '1' 346 through 'n' 348, and implementing it in that location 350. The same, or another, data center technician may then be responsible for configuring the data center asset 244, establishing network connectivity, applying configuration files, and so forth. To continue the example, the same, or another, data center administrator or technician may be responsible for remediating hardware issues, such as replacing a disc drive in a server or Redundant Array of Independent Disks (RAID) array, or software issues, such as updating a hardware driver or the version of a server's operating system. Accordingly, certain embodiments of the invention reflect an appreciation that a significant amount of coordination may be needed between data center system administrators and data center technicians to assure efficient and reliable operation of a data center.

In various embodiments, certain data center monitoring and management operations may include a data center remediation operation, described in greater detail herein. In certain embodiments, a data center remediation operation may be performed to remediate a particular data asset 244 issue at a particular data asset location 350 in a particular data center '1' 346 through 'n' 348. In certain embodiments, the data center remediation operation may be performed to ensure that a particular data center asset location 350 in a particular data center '1' 346 through 'n' 348 is available for the replacement or upgrade of an existing data center asset 244. As an example, a data center remediation operation may involve deployment of a replacement server that occupies more rack space than the server it will be replacing.

In various embodiments, the data center monitoring and management console 118, or the data center monitoring and management application 310 through 320, or a combination of the two, may be implemented in a failure tracking mode to capture certain data center asset 244 telemetry. In various embodiments, the data center asset 244 telemetry may include data associated with the occurrence of certain events, such as the failure, or anomalous performance, of a particular data center asset 244, or an associated workload 360, in whole, or in part. In certain embodiments, the data center asset 244 telemetry may be captured incrementally to provide a historical perspective of the occurrence, and evolution, of an associated data center issue.

In various embodiments, the data center monitoring and management console 118 may likewise be implemented generate certain remediation operation notes. For example, the data center monitoring and management console 118 may enter certain data center asset 244 remediation instructions in the data center remediation operation notes. In various embodiments, the data center remediation operation notes may be implemented to contain information related to data center asset 244 replacement or upgrade parts, data center asset 244 files that may be needed, installation and configuration instructions related to such files, the physical location 350 of the data center asset 244, and so forth. In certain embodiments, a remediation task 344 may be generated by associating the previously-generated data center remediation operation notes with the remediation documentation, data center asset files, or other remediation resources 342 most pertinent to the data center issue, and the administrator, and any data center personnel selected or its remediation. As used herein, a data center remediation task 344 broadly refers to one or more data center remediation operations, described in greater detail herein, that can be assigned to one or more users 'A' 302 through 'x' 312.

Certain embodiments of the invention reflect an appreciation that a group of data center personnel, such as users 'A' 302 through 'x' 312, will likely possess different skills, certifications, levels of education, knowledge, experience, and so forth. As a result, remediation documentation that is suitable for certain data center personnel may not be suitable for others. For example, a relatively inexperienced data center administrator may be overwhelmed by a massive volume of detailed and somewhat arcane minutiae related to the configuration and administration of multiple virtual machines (VMs) on a large server. However, such remediation documentation may be exactly what a highly skilled and experienced data center administrator needs to remediate subtle server and VM configuration issues.

Conversely, the same highly skilled and experienced data center administrator may be hampered, or slowed down, by being provided remediation documentation that is too simplistic, generalized, or high-level for the data center issue they may be attempting to remediate. Likewise, an administrator who is moderately skilled in configuring VMs may benefit from having step-by-step instructions, and corresponding checklists, when remediating a VM-related data center issue. Accordingly, as used herein, pertinent remediation documentation broadly refers to remediation documentation applicable to a corresponding data center issue that is most suited to the skills, certifications, level of education, knowledge, experience, and so forth of the data center personnel assigned to its remediation.

In various embodiments, the data center monitoring and management console 118 may be implemented to generate a corresponding notification of the remediation task 344. In certain embodiments, the resulting notification of the remediation task 344 assignment may be provided to the one or more users 'A' 302 through 'x' 312 assigned to perform the remediation task 344. In certain embodiments, the notification of the remediation task 344 assignment may be respectively provided to the one or more users 'A' 302 through 'x' 312 within the UI 306 through 316 of their respective user devices 'A' 304 through 'x' 314. In certain embodiments, the notification of the remediation task 344 assignment, and the remediation task 344 itself, may be implemented such that they are only visible to the users 'A' 302 through 'x' 312 to which it is assigned.

In certain embodiments, the data center monitoring and management console 118 may be implemented to operate in a monitoring mode. As used herein, monitoring mode broadly refers to a mode of operation where certain monitoring information provided by the monitoring and management console 118 is available for use by one or more users 'A' 302 through 'x' 312. In certain embodiments, one or more of the users 'A' 302 through 'x' 312 may be command center 340 users. In certain embodiments, the data center monitoring and management console 118 may be implemented to operate in a management mode. As used herein, management mode broadly refers to a mode of operation where certain operational functionality of the data center monitoring and management console 118 is available for use by a user, such as users 'A' 302 through 'x' 312.

FIG. 4 shows a simplified process flow of the performance of certain data center monitoring and management operations implemented in accordance with an embodiment of the invention. In various embodiments, certain data center assets associated with a data center monitoring and management environment, described in greater detail herein, may be monitored in step 402 to detect the occurrence of associated events and data center issues. In various embodiments, certain associated event and data center issue data, likewise described in greater detail herein, may be collected in step 404. In various embodiments, the collected event and data center issue data may include certain telemetry data, log data, and alert data associated with a particular data center asset.

In certain embodiments, the telemetry data may include information corresponding to the operational status of a particular data center asset. In certain embodiments, the log data may include information corresponding to the occurrence of an event during a particular data center asset's lifecycle. In certain embodiments, alert data may include information associated with the generation of an alert corresponding to the occurrence of a data center issue during a particular data center asset's lifecycle.

As an example, the telemetry data may indicate the operating temperature of a server is approaching its upper limit. To continue the example, the log data may likewise indicate one or more fans within the server may be approaching their mean time before failure (MTBF) specification. To continue the example further, the alert data may provide information related to the maximum operational temperature for the server being reached.

In certain embodiments, the detection of a data center issue may relate to the occurrence of an anomalous event within a data center monitoring and management environment. As an example, ten servers, each of which is of the same make, model, and configuration, may receive a driver update. As a result, one of the servers crashes, while the other nine do not. In this example, the server that crashes is an anomalous event. Likewise, the fact that the other nine servers have not crashed provides context to the anomalous event.

In certain embodiments, the detection of a data center issue may relate to recognizing the pattern of a particular data center issue. As an example, the operational throughput of a server may decline more than twenty percent whenever an associated workflow utilizes more than ninety percent of its currently available memory. In this example, the correlation of the server's throughput to the utilization of its available memory establishes a recognizable pattern which can likewise provide context.

In certain embodiments, the detection of a data center issue may relate to the detection of new data center issues as they occur within a data center monitoring and management environment. As an example, a router port assigned to a particular server running a particular workload may have performed as expected for nine months, only to unexpectedly begin passing traffic intermittently. Furthermore, the ports of other routers of the same make, model, and configuration do not exhibit the same behavior. In this example, the unexpected intermittent performance of a router port that has been operating properly for an extended period of time is a new issue. Likewise, the fact that the other router ports have historically performed as expected provides context.

In certain embodiments, the detection of a data center issue may relate to the detection of low visibility data center issues as they occur within a data center monitoring and management environment. As an example, an individual disk drive in a redundant array of independent disks (RAID) may log infrequent read errors (e.g., an average of three a day). Since the disk drive is part of a RAID array, the other disk drives in the array tend to mask its erratic performance. However, the fact that the read errors are occurring on a regular basis indicate that the disk drive may fail at some point in the future. In this example, the infrequent read errors represent a low visibility issue, which may or may not be prioritized for remediation.

In certain embodiments, the detection of a data center issue may relate to the detection of ongoing unresolved data center issues as they occur within a data center monitoring and management environment. As an example, a compressor in a cooling unit may cycle off for short periods of time at random intervals. However, despite best efforts by data center personnel, the cause for its behavior cannot be determined. In this example, the erratic behavior of the compressor is an ongoing unresolved issue. Furthermore, the lack of success in remediating the issue in the past may result in the issue being assigned a low priority.

In various embodiments, detection of a data center issue may lead to the performance of a preliminary analysis of the issue to assign it a data center issue priority level. In certain of these embodiments, the prioritization of a particular data center issue to be remediated may be established by assigning a data center issue priority level value, such as '1', '2', '3', '4', and '5', and so forth. As an example, a particular data center issue may be assigned 422 a priority level value of '1', which is the highest priority. In certain of these embodiments, various statistical analysis and machine learning approaches may be used, as described in greater detail herein, to automatically generate a data center issue priority level value.

The collected event and data center issue data collected in step 404 may then processed in step 406 into a form that may be used in the performance of one or more data center monitoring and management operations, as described in greater detail herein. In various embodiments, the event and data center issue data collected in step 404 may be processed in step 406 to facilitate the performance of a data center issue contextualization operation, a data center issue analysis operation, or a data center issue prioritization operation, or a combination thereof. In various embodiments, certain health issue evaluations may be performed in step 408 to perform an evaluation of a particular data center issue. In certain embodiments, such an evaluation may include evaluation of a data center asset's operational health rules, or updating its operational health state, or both.

Then, in step 410, one or more data center issue contextualization operations, data center issue analysis operations, or data center issue prioritization operations, or a combination thereof, may be performed to contextualize and analyze a particular data center issue. In various embodiments, one or more data center issue contextualization operations, or one or more data center issue analysis operations, or a combination thereof, may be performed to map and correlate certain data center issues to one another. In various embodiments, one or more data center issue contextualization operations, or one or more data center issue analysis operations, or a combination thereof, may be performed to collect, aggregate, and analyze certain data center issues.

In various embodiments, one or more data center issue contextualization operations, or one or more data center issue analysis operations, or a combination thereof, may be performed, as described in greater detail herein, to determine one or more root causes for a particular data center issue. In various embodiments, one or more data center issue contextualization operations, or one or more data center issue analysis operations, or a combination thereof, may be performed to generate a recommendation for resolving a particular data center issue. Skilled practitioners of the art will recognize that many such embodiments are possible. Accordingly, the foregoing is not intended to limit the spirit, scope or intent of the invention.

Data center issue disposition operations may then be performed in step 412. In certain embodiments, one or more data center issue disposition operations may be performed to identify a data center asset issue related to a particular data center asset's operational health. In certain embodiments, one or more data center issue disposition operations may be performed to generate a data center asset issue report related to a particular data center asset's operational health. In various embodiments, one or more data center issue disposition operations may be performed to notify certain data center personnel of the occurrence of a particular data center asset issue.

One or more detected data center issues may then be scheduled for remediation in step 414. In certain embodiments, a particular data center issue may be compared to the same, or substantively similar, data center issues that have been successfully remediated in the past to determine possible data center remediation operations to perform. In various embodiments, information associated with such similar, or substantively similar, data center issues, and the data center remediation operation used to successfully remediate them, may be used to perform the remediation.

In various embodiments, the remediation of a particular data center issue may be performed according to a particular remediation mode of operation. In certain embodiments, the remediation mode of operation may be implemented to be a manual remediation mode of operation, a semi-automated remediation mode of operation, or an automated remediation mode of operation. In these embodiments, the decision of whether to perform a particular remediation operation in a manual remediation mode of operation, a semi-automated remediation mode of operation, or an automated remediation mode of operation, is a matter of design choice.

The results of performing the remediation operation is then provided as additional data center issue data in step 404. Likewise the results of performing the remediation operation may be used for data center issue reporting purposes in step 416. Thereafter, the results of performing the remediation operation may be used in step 418 for data center issue data management purposes familiar to those of skill in the art.

FIG. 5 shows a simplified process flow of the performance of data center issue contextualization, analysis, and prioritization operations implemented in accordance with an embodiment of the invention. In various embodiments, certain data center issue contextualization operations 502, described in greater detail herein, may be performed. In various embodiments, certain data center issue analysis operations 504, likewise described in greater detail herein, may be performed thereafter. In various embodiments, certain data center issue prioritization operations, likewise as described in greater detail herein, may then be performed.

As used herein, a data center issue contextualization operation broadly refers to any task, function, procedure, or process performed, directly or indirectly, within a data center monitoring and management environment to provide the context of the occurrence of a particular data center issue, as described in greater detail herein. As likewise used herein, a data center issue analysis operation broadly refers to any task, function, procedure, or process performed, directly or indirectly, within a data center monitoring and management environment to determine the root causality of a particular data center issue, its relevance, and its resulting impact, or a combination thereof, as likewise described in greater detail herein. Likewise, as used herein, a data center issue prioritization operation broadly refers to any task, function, procedure, or process performed, directly or indirectly, within a data center monitoring and management environment to prioritize a particular data center issue for resolution, or remediation, or both.

Figure 6:
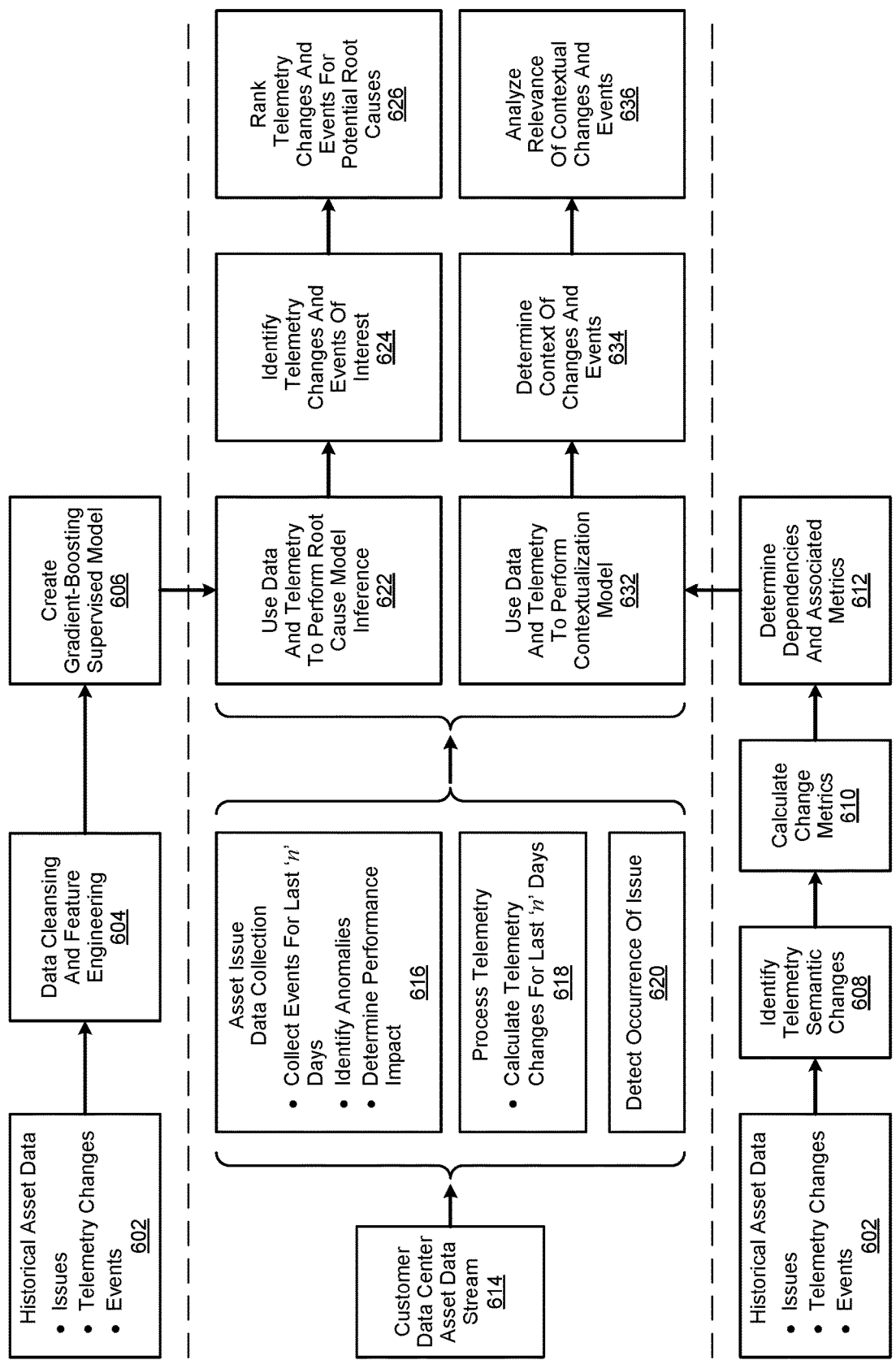
FIG. 6 shows a simplified process flow of the performance of data center issue contextualization operations.

FIG. 6 shows a simplified process flow of the performance of data center issue contextualization operations implemented in accordance with an embodiment of the invention. In various embodiments, certain historical data center asset data is collected in step 602. In certain of these embodiments, the historical data center asset data may include data associated with one or more data center issues, telemetry changes, and one or more events, and so forth.

The collected historical data center asset data is then processed in step 604 using data cleansing and machine language (ML) feature engineering approaches familiar to skilled practitioners of the art. The cleansed and feature-engineered data is then used in step 606 to create a gradient-boosting supervised model. Those of skill in the art will be familiar with the concept of gradient-boosting, which is a machine learning technique commonly used for regression, classification, and other tasks, that produces a prediction model in the form of an ensemble of weak prediction models, typically decision trees. In various embodiments, historical data center issue data associated with a plurality of customer data centers may be used to produce a prediction model. In certain of these embodiments, the prediction model may be used to determine the root causality of a particular data center issue.

In various embodiments, certain historical data center asset data collected in step 602 may likewise be processed in step 608 to identify semantic changes in telemetry. As used herein, a semantic change broadly refers to the meaning of the change. Accordingly, as used herein, semantic changes in telemetry broadly refers to changes in a data center asset's telemetry that may infer, directly or indirectly, a particular meaning relevant to the data center asset's operational status. As an example, the unused capacity of a storage device may have changed from 1,000 MB to 100 MB in the span of two minutes. In this example, the semantic change may be characterized as a large change in the unused capacity of the device, a moderate change, or a small change. In this example, the semantics selected to characterize such a change as large, moderate, or small is a matter of design choice.

Metrics associated with the identified semantic changes are then calculated in step 610. In certain embodiments, the metrics calculated in step 610 may include the percentage change in performance of a particular data center asset. In certain embodiments, the metrics calculated in step 610 may include the percentage change in the available capacity of a particular data center asset. In certain embodiments, the metrics calculated in step 610 may include changes in data protection associated with a particular data center asset. Skilled practitioners of the art will recognize that many examples of such metrics are possible. Accordingly, the foregoing is not intended to limit the spirit, scope, or intent of the invention.

The resulting change metrics are then processed in step 612 to determine dependencies and their associated metrics. In certain embodiments, the dependencies and their associated metrics may be determined in step 612 through the use of a chi-squared test. Those of skill in the art will be familiar with a chi-squared ($x^2$) test, which is a statistical hypothesis test that is valid to perform when the test statistic is $x^2$ distributed under the null hypothesis. Typically, a chi-squared test is used to determine whether there is a statistically significant difference between the expected frequencies and the observed frequencies in one or more categories of a contingency table.

Observations resulting from a chi-squared test are classified into mutually exclusive classes. If the null hypothesis that there are no differences between the classes in the population is true, the test statistic computed from the observations follows a $x^2$ frequency distribution. Accordingly, the purpose of the test is to evaluate how likely the observed frequencies would be assuming the null hypothesis is true.

In certain embodiments, the dependencies and their associated metrics may be determined in step 612 through the use of a Cramer's V test. Skilled practitioners of the art will likewise be familiar with Cramer's V test, which is a measure of association between two nominal variables, based upon a chi-squared statistic, that gives a value between 0 and +1 (inclusive). In typical use, Cramer's V test shows the significance of intercorrelation between two discrete variables and may be used with variables having two or more levels.

In various embodiments, a stream of data center asset data associated with a particular customer's data center monitoring and management environment, described in greater detail herein, is received on an ongoing basis in step 614. The stream of data center asset data is then processed in step 616 to identify and collect events for the last 'n' number of days, where the value of 'n' is a matter of design choice. Data center asset data associated with the collected events is then processed to identify anomalies, described in greater detail herein, which are in turn analyzed to determine their impact on the performance of their associated data center assets. Then, in step 618, changes in telemetry for the same period of time is identified and collected, followed by the detection of associated data center issues in step 620.

The information collected in steps 616, 618, and 620 is then used with the gradient-boosting supervised model created in step 606 to perform a root cause model inference in step 622. The resulting model inferences are then used in step 624 to identify telemetry changes and events of interest. In certain embodiments, Shapley Additive Explanations (SHAP) approaches may be used in step 624 to identify the telemetry changes and events of interest. Skilled practitioners of the art will be familiar with SHAP values, which are often used when a complex model, such as the gradient-boosting model created in step 606, receives feature inputs and produces predictions as output.

In particular, various SHAP approaches are often used to provide an understanding of what decisions the model is making and to assist in identifying the contribution of each feature of the prediction. In certain embodiments, the resulting SHAP values are then used in step 626 to rank the telemetry changes and events of interest. In certain embodiments, the ranking provides an indication of the root causality of a particular data center issue. For example, the highest ranked telemetry changes and events of interest are more likely to provide an indication of root causality, while those that are ranked lower are less likely to.

The information collected in steps 616, 618, and 620 is likewise used with the dependencies and associated metrics determined in step 612 to perform a contextualization model in step 632. As used herein, a contextualization model broadly refers to a formal, or semi-formal, representation of how certain contextual data is defined, structured, maintained, and referenced. In turn, the resulting contextualization model is used in step 634 to determine the context of certain changes and events of interest. In various embodiments, the context of certain changes and events of interest may be oriented towards telemetry temporal changes. In certain embodiments, the context of certain changes and events of interest may be oriented toward the semantic meaning of temporal changes. The relevance of the context of certain changes and events of interest are then analyzed in step 636.

FIG. 7 is a timeline implemented in accordance with an embodiment of the invention to show the occurrence of certain example data center events and issues. As shown by the data center events and issue timeline 702 in FIG. 7, various data center events and issues have occurred at various points in time. For example, the capacity of a particular storage that is currently being used at time $t_1$ has changed 704 to 100 MB.

Likewise, a performance anomaly event associated with the storage device occurred at time $t_1$ followed by the amount of storage capacity being used at time $t_3$ changing to 1,000 MB. Thereafter, the storage pool name changed at time $t_4$, followed by the occurrence of a data center issue at time $t_5$ signifying that the storage device is running out of available capacity. Likewise, an unspecified event occurred at time $t_6$, followed by an unspecified data center issue occurring at time $t_7$ and a change in telemetry at time $t_8$.

FIG. 8 shows a simplified process flow of the performance of data center issue contextualization operations implemented in accordance with an embodiment of the invention to determine the root causality of a data center issue. In various embodiments, certain data center issue factors may be identified and collected in step 802 and then used to generate features for analysis in step 804. For example, one such data center issue factor may be the occurrence of a data center issue indicating that a particular storage device is running out of available storage capacity. A second factor may be that telemetry associated with the data storage device is collected once an hour, and a third may be such telemetry data has been used for the last 'n' number of days. Likewise, certain calculated telemetry changes may provide one or more additional factors.

The resulting features 806 are then classified as '1' 808, "storage capacity used changed, '2' 810 "performance anomaly occurred," '3' 812 "storage pool name changed," and so forth. The classified features 806 are then combined with the associated data center issue 814 "storage system capacity running out of space" for root causality analysis. A gradient-boosting tree model, described in greater detail herein, then uses the combined classified features 806 and the associated data center issue 814 information in step 816, along with historical data center issue data, to generate a prediction inference. As a result, a determination is made in step 818 that the root causality of the data center issue 814 was telemetry associated with changes in the amount of storage capacity being used.

FIG. 9 shows a simplified process flow of the performance of data center issue contextualization operations implemented in accordance with an embodiment of the invention to determine the context of a data center issue. In various embodiments, certain telemetry, semantic changes, and features may be collected in step 902 and then used in step 904 to calculate certain change metrics, as described in greater detail herein. A test for their dependencies is then performed in step 906, along with generating their associated metrics, likewise as described in greater detail herein. Certain data center issue data, and associated telemetry is then used in step 908, as described in greater detail herein to generate a contextualization model. The context of changes is then determined in step 910, followed by the relevance of the context of the changes being analyzed in step 912, likewise as described in greater detail herein.

Figures 10, 11:
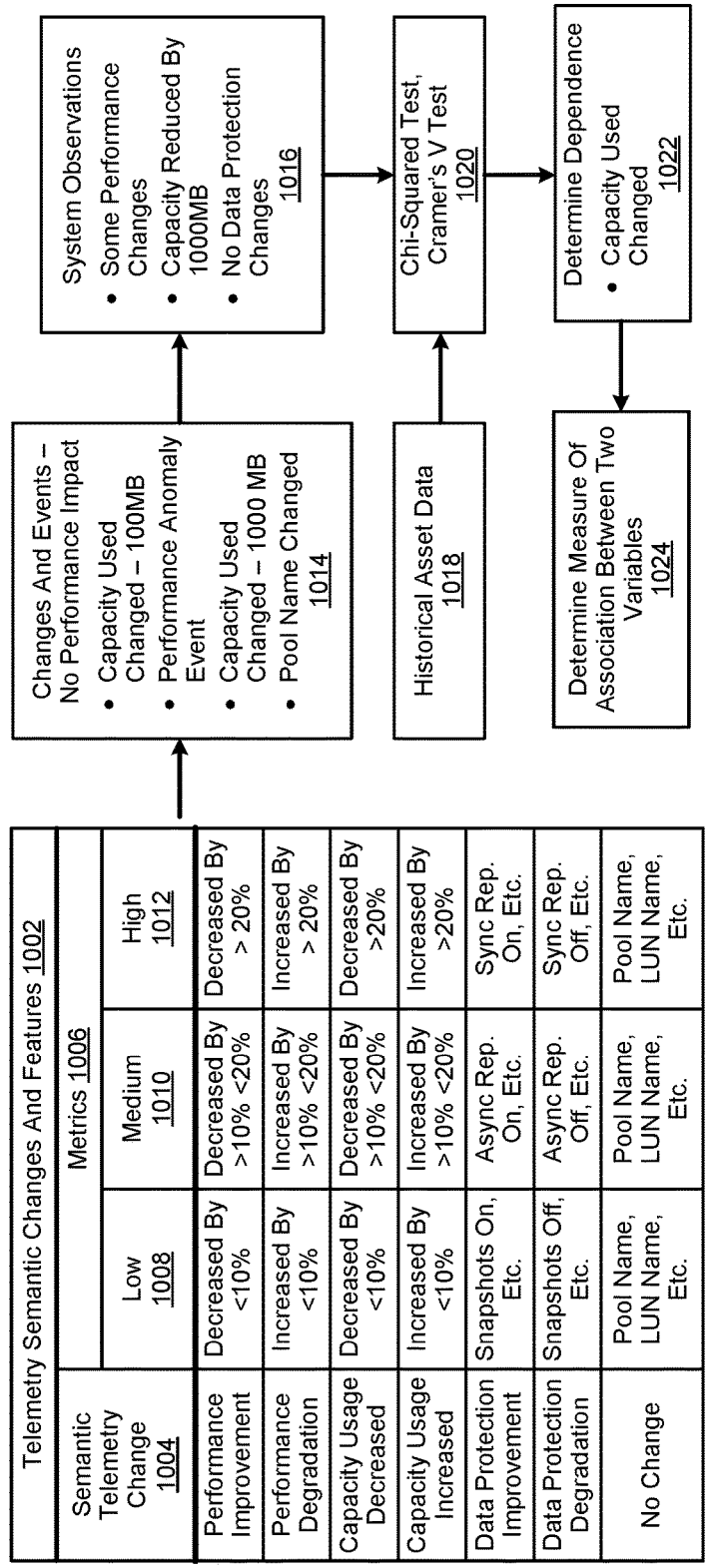
FIG. 10 shows a simplified process flow of the performance of data center issue contextualization operations to identify certain dependencies.
FIG. 11 is a table showing example feature enrichments corresponding to certain data center events and issues.

FIG. 10 shows a simplified process flow of the performance of data center issue contextualization operations implemented in accordance with an embodiment of the invention to identify certain dependencies. In various embodiments, data associated certain telemetry semantic changes and features 1002 may be processed to determine their semantic telemetry change classification 1004, which are in turn described by certain qualitative and quantitative metrics 1006. In certain embodiments, the qualitative metrics 1006 may include "low" 1008, "medium" 1010, and "high" 1012.

For example, as shown in FIG. 10, a semantic telemetry change classification 1004 of "performance improvement" may have an associated qualitative metric 1006 of "low" 1008, which corresponds to a quantitative metric 1006 of "decreased by <10%." As another example, a semantic telemetry change classification 1004 of "data protection improvement" may have an associated qualitative metric 1006 of "high" 1012, which corresponds to a quantitative metric 1006 of "data synchronization and replication on, and so forth." Skilled practitioners of the art will recognize that many such examples are possible. Accordingly, the foregoing is not intended to limit the spirit, scope, or intent of the invention.

The resulting semantic telemetry change classifications 1004 and their associated qualitative and quantitative metrics 1006 are then processed in step 1014 to identify those changes and events that have no impact on the performance of a data center asset associated with a particular data center event. Examples of such changes and events may include the capacity of a storage device being used changing from 100 MB to 1,000 MB, the occurrence of a performance anomaly event, the name of a storage pool being changed, and so forth.

Then, in step 1016, the remaining changes and events are processed in step 1016 to generate certain system observations, such as some performance changes, storage capacity reduced by 1,000 MB, no data protection changes, and so forth. The system observations generated in step 1016 are used in combination with certain historical data 1018 in step 1020, as described in greater detail herein, to perform a chi-squared test and a Cramer's V test, the results of which are used to determine a dependence of "capacity used changed" in step 1022. The measure of association between two variables (e.g., measurement is high) is then determined in step 1024, likewise as described in greater detail herein.

FIG. 11 is a table implemented in accordance with an embodiment of the invention to show example feature enrichments corresponding to certain data center events and issues. In various embodiments data associated with a particular data center event 1102 may be processed to determine its associated features 1104 of interest. As an example, as shown in FIG. 11, a data center event 1102 may have an associated description of, "Issue '1'-System '1'-Storage Capacity Used Change." Likewise, its associated features 1104 may include 'version" 1106, "location" 1108, "model" 1110, "topology" 1112, "alerts" 1114, "health" 1116, and so forth. As likewise shown in FIG. 11, the data center event 1102, and its associated features 1104, are also associated with a telemetry change 1118, which indicates that the used capacity of a storage device associated with the data center event 1102 changed to 100 MB at time $t_1$ and to 1,000 MB at time $t_3$. In certain embodiments, the data associated with the data center event 110 may be processed with its associated features 1104, and its associated telemetry change 1118 to generate enriched features 1120 of the available capacity of the storage device decreased to "low" at time $t_1$ and to "high" at time $t_3$.

Figure 12:
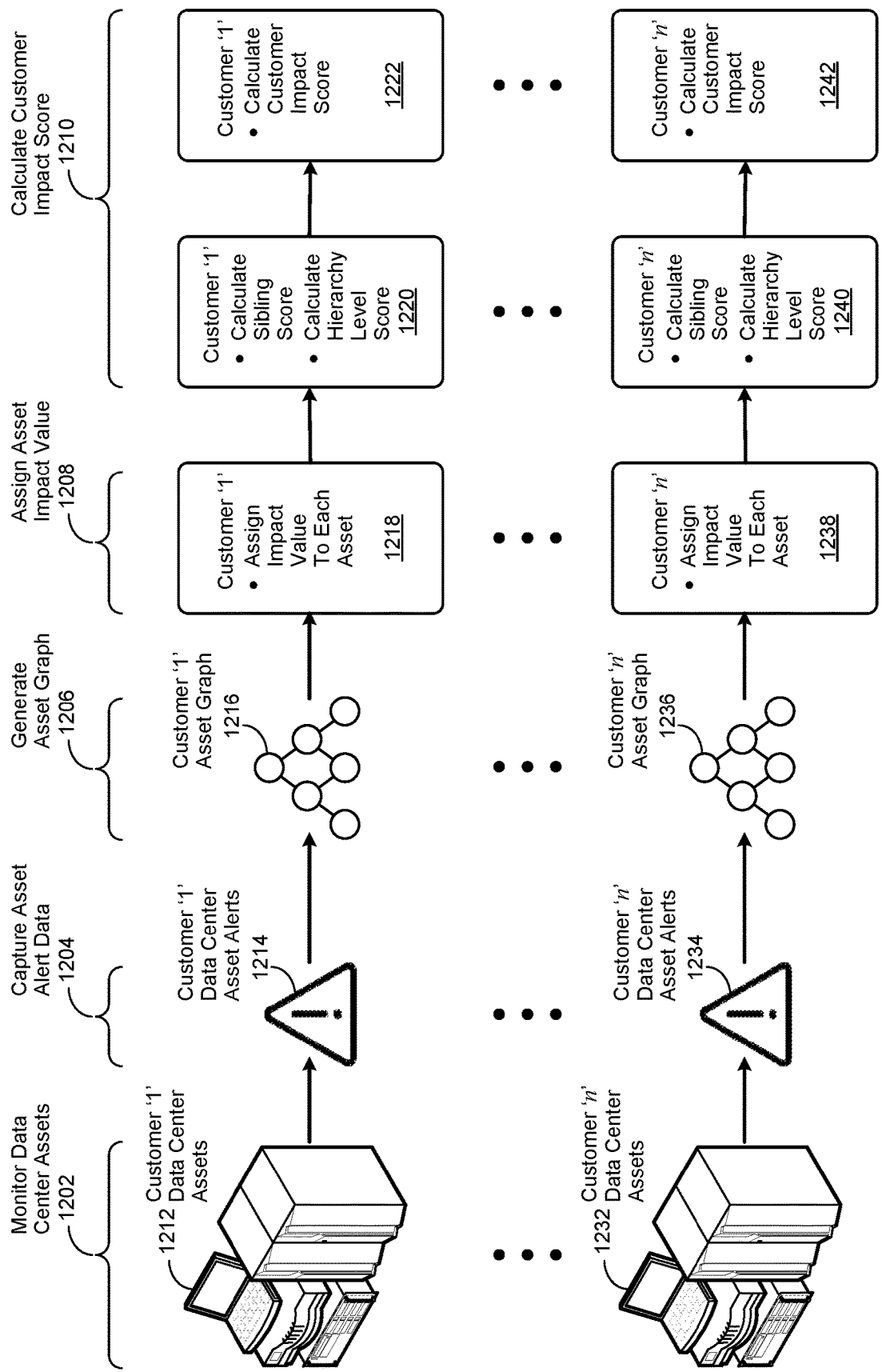
FIG. 12 shows a simplified process flow of the performance of data center issue analysis operations.

FIG. 12 shows a simplified process flow of the performance of data center issue analysis operations implemented in accordance with an embodiment of the invention. In certain embodiments, one or more data center issue analysis operations, described in greater detail herein, may be performed to determine which other data center assets may be affected by the occurrence of a particular data center issue. As an example, a particular network port on a router may begin experiencing intermittent faults, which results in an alert being generated for the router.

To continue the example, a storage device may be connected to the faulty port, and as a result, an alert is likewise generated that the storage device is operating in a degraded state, even though the storage device itself is operating properly. In this example, the intermittent faults exhibited by the router port are affecting the operation of the storage device. Accordingly, while the degraded operational state of the router may be characterized as a data center issue, the context is that the cause of the issue is the intermittent faults of the router port.

In certain embodiments, one or more data center issue analysis operations may be performed to determine what other classes data center assets (e.g., compute, storage, network, etc.) may be affected by the occurrence of a particular data center issue. In certain embodiments, one or more data center issue analysis operations may be performed to determine what type of performance degradation (e.g., network throughput, computational speed, response time, etc.) is being experienced due to the occurrence of a particular data center issue. In certain embodiments, one or more data center issue analysis operations may be performed to determine what level of performance degradation (e.g., 60%) is being experienced due to the occurrence of a particular data center issue.

In certain embodiments, one or more data center issue analysis operations may be performed to determine the business impact (e.g., number of hourly online transactions decreased by 12%) due to the occurrence of a particular data center issue. Skilled practitioners of the art will recognize that many such examples of a data center issue analysis operation are possible. Accordingly, the foregoing is not intended to limit the spirit, scope, or intent of the invention.

In certain embodiments, the performance of certain data center assets is monitored in step 1202, followed by capturing data center asset alert data in step 1204, such as the alerts which provide notification of a data center issue, which is then used in step 1206 to generate a logical graph, or a physical graph, or both, of all associated data center assets. An asset impact value is then assigned to each data center asset in step 1208. In certain embodiments, the asset impact value may be assigned to each data center asset manually, automatically, or semi-automatically. In certain embodiments, the asset impact value may be qualitative (e.g., high, medium, low, etc.), or quantitative (e.g., '20%', '0.45', '3', etc.), or a combination of the two.

In various embodiments, certain rules familiar to those of skill in the art may be used to assign a particular asset impact value to each of the associated data center assets. In these embodiments, the asset impact value selected to be assigned to a particular data center asset, and the method by which it is assigned, is a matter of design choice. The resulting asset impact values are then used in step 1210 to calculate a customer impact score.

Referring now to FIG. 12, data center assets associated with customer '1' 1212 through n' 1232 are respectively monitored to identify customer data center asset alerts '1' 1214 through n' 1234. Data center assets associated with customer '1' 1212 through n' 1232 are then respectively mapped to customer data center asset graphs '1' 1216 through n' 1236. In various embodiments, the customer data center asset graphs '1' 1216 through n' 1236 may be implemented as a logical graph, or a physical graph, or a combination of the two.

In certain of these embodiments, each data center asset associated with customer '1' 1212 through n' 1232 may be respectively mapped to a particular node of the customer data center asset graphs '1' 1216 through n' 1236. In various embodiments, identified customer data center alerts '1' 1214 through 'n' 1234 are respectively associated with the nodes representing data center assets associated with customer '1' 1212 through n' 1232. In certain embodiments, two or more nodes of the customer data center asset graphs '1' 1216 through n' 1236 may respectively represent sibling data center assets associated with customer '1' 1212 through n' 1232.

In various embodiments, two or more such nodes of a graph may share one or more parent nodes, with the sharing represented as graph edges. As an example, a server rack may contain sixteen identically configured servers, each of which is represented as a node. To continue the example, each server is respectively connected to a particular port of the same router, which is likewise represented as a node. In this example, the nodes representing each server are sibling nodes as they share the same parent node, which represents the router.

In certain embodiments, two or more sibling nodes may share one or more child nodes, with the sharing represented as graph edges. To continue the previous example, two of the servers in the server rack may share access to two storage units. In this example, the two servers are represented as sibling nodes and the two storage units are likewise represented as child nodes, which in turn are sibling nodes to one another.

In various embodiments, a data center asset graph may be represented in a hierarchical form. In certain of these embodiments, one or more nodes may represent a particular level of a hierarchy, with one or more parent nodes representing a higher level of the hierarchy and one or more child nodes representing a lower level of the hierarchy. Those of skill in the art will recognize that many such examples of parent, sibling, and child nodes, and associated hierarchies, are possible. Accordingly, the foregoing is not intended to limit the spirit, scope, or intent of the invention.

An asset impact value, described in greater detail herein, is then respectively assigned 1218, 1238 to each data center asset represented by a node in the data center asset graph associated with customer '1' 1216 through 'n' 1236. Thereafter, sibling and hierarchy scores are respectively performed 1220, 124 for each data center asset represented by a node in the data center asset graph associated with customer '1' 1216 through n' 1236 as follows:

> sibling score for each data center asset=number of siblings+asset impact value > hierarchy level score for each data center asset=number of graph edges to parent nodes+ number of graph edges to child nodes+asset impact value The customer impact score for each data center asset represented by a node in the data center asset graph associated with customer '1' 1216 through 'n' 1236 is then calculated 1222, 1242 as follows:

customer impact score=(sibling score+hierarchy level score)/100*100 to yield a customer impact score value between 0-100, where the higher the value, the higher the impact of a data center issue associated with the data center asset.

Figure 13:
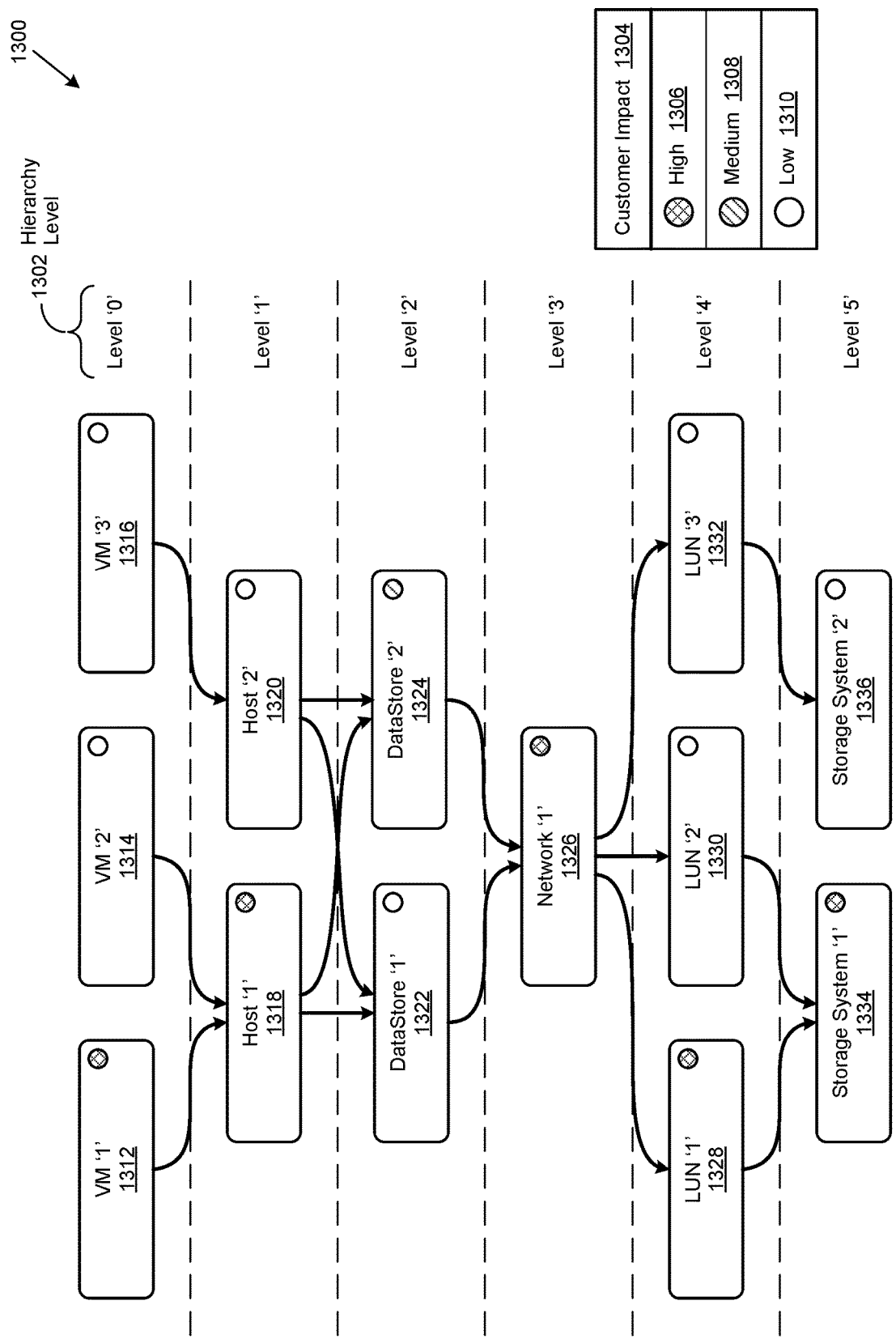
FIG. 13 is a simplified data center asset graph showing the relative impact of data center issues due to the interdependencies of certain data center assets.

FIG. 13 is a simplified data center asset graph showing the relative impact of data center issues due to the interdependencies of certain data center assets implemented in accordance with an embodiment of the invention. In this embodiment, as shown in FIG. 13, storage systems '1' 1334 and '2' 1336 are sibling data center assets associated with hierarchy level 1302 '5' of a data center asset graph 1300. Likewise, logical units (LUNs) '1' 1328, '2' 1330, and '3' 1332 are sibling data center assets associated with hierarchy level 1302 '4', while network '1' 1326 is associated with hierarchy level 1302 '3' and has no sibling. As likewise shown in FIG. 13, datastores '1' 1322 and '2' 1324 are sibling data center assets associated with hierarchy level 1302 '2', while hosts '1' 1318 and '2' 1320 are sibling data center assets associated with hierarchy level 1302 '1', and virtual machines (VMs) '1' 1312, '2' 1314, and '3' 1316 are sibling data center assets associated with hierarchy level 1302 '0'.

In certain embodiments, as described in greater detail herein, a customer impact score 1304 of "high" 1306, "medium" 1308, or "high" 1310 may be calculated for each data center asset shown in the data center asset graph 1300. As an example, a data center issue associated with LUN '1' 1328 may have occurred. In this example, LUN '1' 1328 is a sibling node of LUNs '2' 1330 and '3' 1332. Accordingly, LUN '1' 1328 is determined to have a customer impact score 1304 of "high" 1306 due to its associated data center issue, but its sibling LUNs '2' 1330 and '3' 1332 are determined to both have a customer impact score 1304 of "low" 1310.

To continue the example, storage system '1' 1334 is a child node of LUN '1' 1328 and '2' 1330, represented by its two graph edges, which results in a customer impact score 1304 of "high" 1306 due to the "high" 1306 customer impact score 1304 of its parent node. Likewise, network '1' 1326, which has no siblings and is a parent node of LUN '1' 1328, has a customer impact score 1304 of "high" 1306 due to the "high" 1306 customer impact score 1304 of its child, LUN '1' 1328. In turn, datastore '2' 1324, which is a sibling of datastore '1' 1322, has a customer impact score 1304 of "high" 1306 due to the "high" 1306 customer impact score 1304 of its child, network '1' 1326. Likewise, host '1' 1318, which is a sibling of host '2' 1320, has customer impact score 1304 of "high" 1306 due to the "high" 1306 customer impact score 1304 of its child, datastore '2' 1324. To continue the example yet further, VM '1' 1312, which is a sibling of VMs '2' 1312 and '3' 1316, also has a customer impact score 1304 of "high" 1306 due to the "high" 1306 customer impact score 1304 of its child, host '1' 1318.

Figure 14:
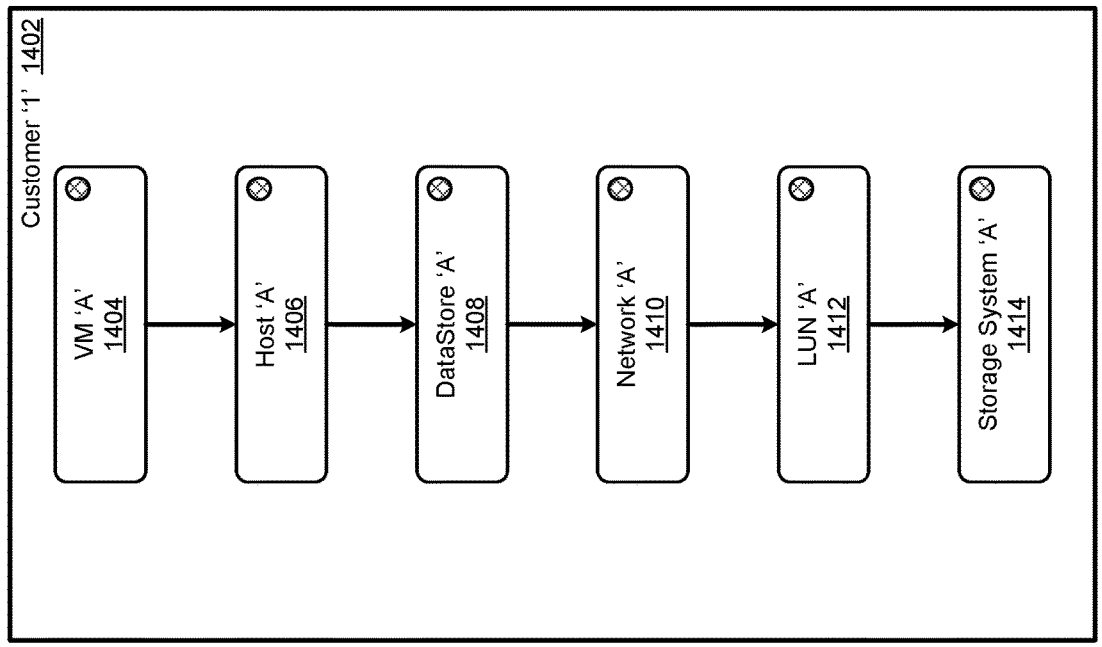
FIG. 14 is a simplified data center asset graph showing the high impact of data center issues resulting from the use of non-redundant data center assets.

FIG. 14 is a simplified data center asset graph showing the high impact of data center issues resulting from the use of non-redundant data center assets implemented in accordance with an embodiment of the invention. In this embodiment, as shown in the data center asset graph for customer '1' 1402, storage system 'A' 1414 is a child of logical unit (LUN) 'A' 1412, which is a child of network 'A' 1410, which in turn is a child of datastore 'A' 1406, which likewise is a child of host 'A' 1406, which is likewise a child of virtual machine (VM) 'A' 1404. Accordingly, as likewise shown in the data center asset graph for customer '1' 1402, storage system 'A' 1414, LUN 'A' 1412, network 'A' 1410, datastore 'A' 1406, host 'A' 1406, and VM 'A' 1404 have no siblings. As a result there is no redundancy, and a data center issue occurring at either storage system 'A' 1414, LUN 'A' 1412, network 'A' 1410, datastore 'A' 1406, host 'A' 1406, or VM 'A' 1404 would have a corresponding effect on all other data center assets associated with customer '1' 1402.

Figure 15:
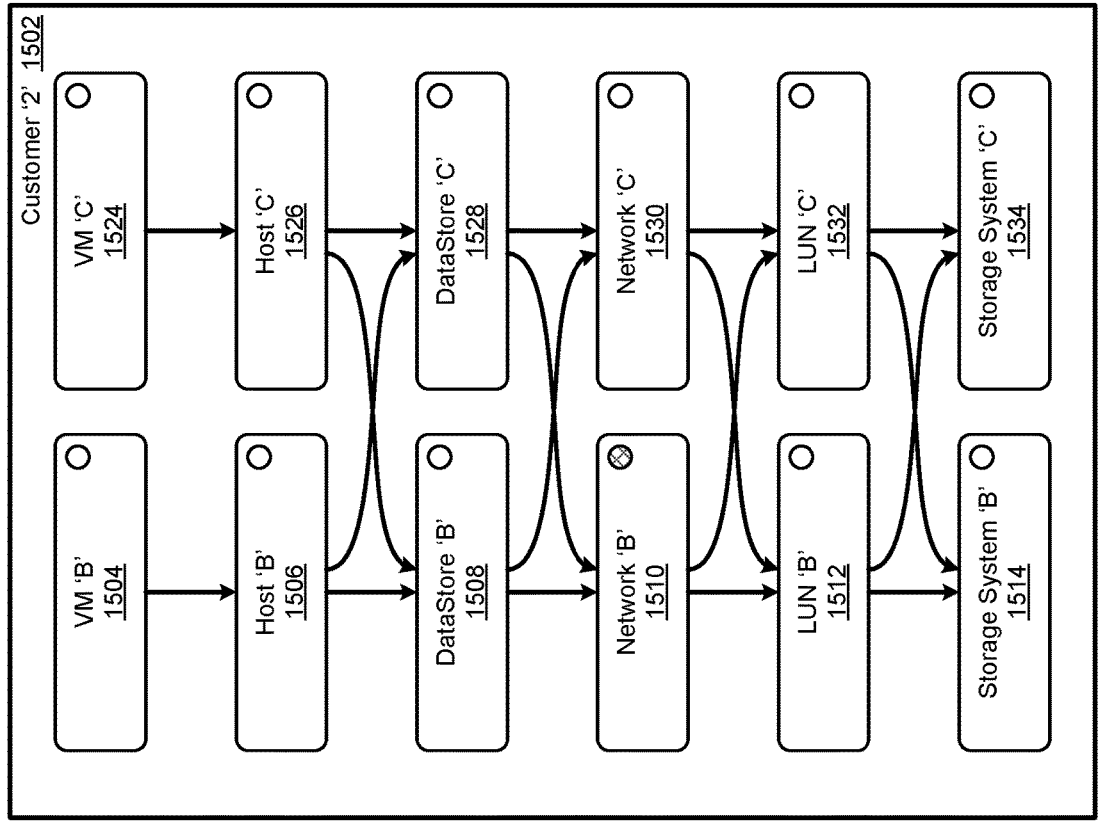
FIG. 15 is a simplified data center asset graph showing the low impact of data center issues resulting from the use of redundant data center assets.

FIG. 15 is a simplified data center asset graph showing the low impact of data center issues resulting from the use of redundant data center assets implemented in accordance with an embodiment of the invention. In this embodiment, as shown in the data center asset graph for customer '2' 1502, sibling storage systems 'B' 1514 and 'C' 1534 are children of sibling logical units (LUNs) 'B' 1412 and 'C' 1532, which are children of sibling networks 'B' 1510 and 'C' 1530. Likewise, sibling networks 'B' 1510 and 'C' 1530 are children of sibling datastores 'B' 1508 and 'C' 1528, which in turn are children of sibling hosts 'B' 1506 and 'C' 1526, which are likewise respectively children of sibling virtual machines (VMs) 'B' 1504 and 'C' 1524. Accordingly, as likewise shown in the data center asset graph for customer '2' 1502, sibling storage systems 'B' 1514 and 'C' 1534, sibling LUNs 'B' 1412 and 'C' 1532, sibling networks 'B' 1510 and 'C' 1530, sibling datastores 'B' 1508 and 'C' 1528, and sibling hosts 'B' 1506 and 'C' 1526 are redundant to one another. As a result of this redundancy, a data center issue occurring at a particular node of the data center asset graph for customer '2' 1502, such as at network 'B' 1510, will have less effect on all other data center assets associated with customer '2' 1502.

Figure 16:
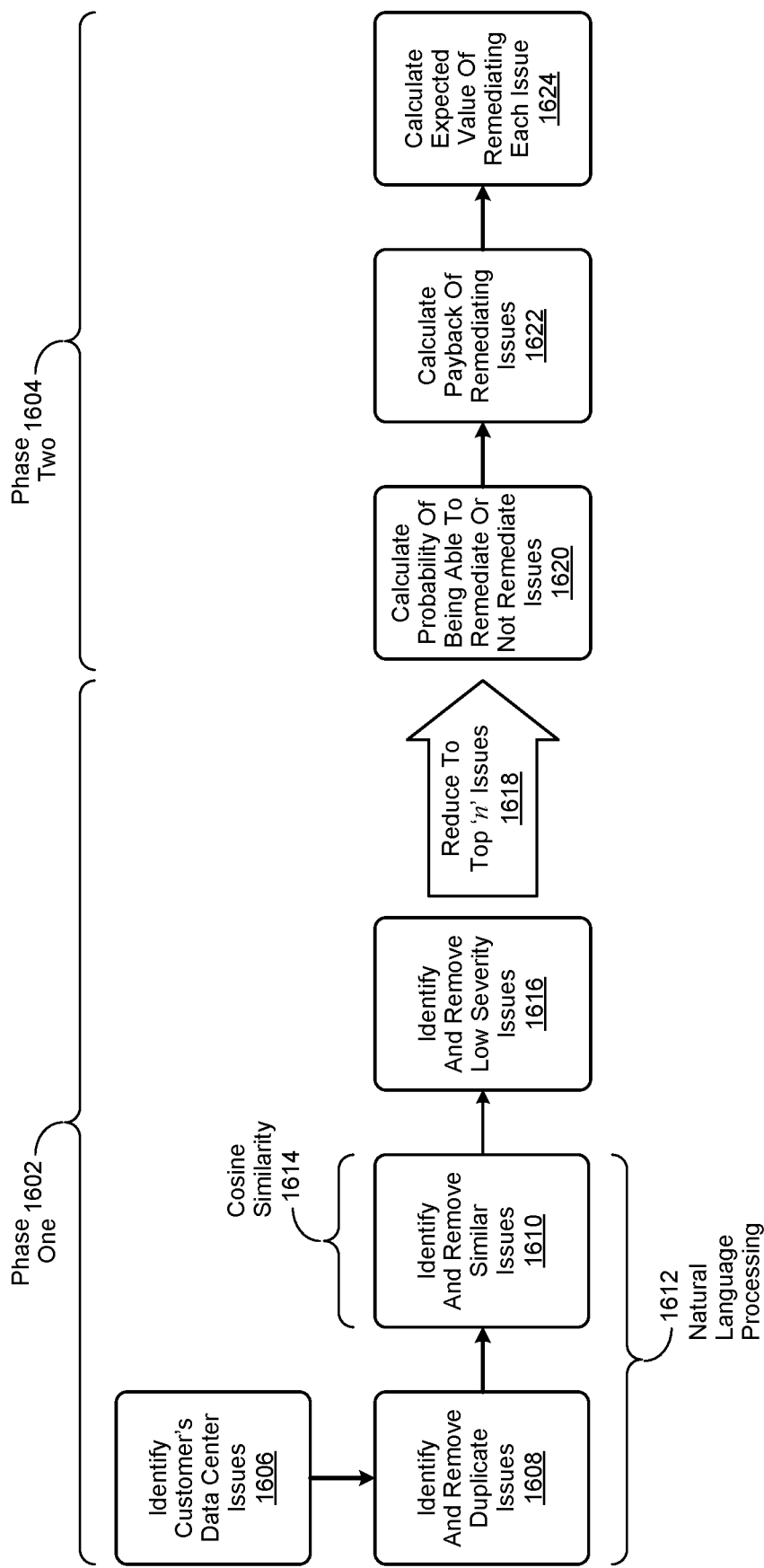
FIG. 16 shows a simplified process flow of the performance of data center issue prioritization operations to prioritize data center issues.

FIG. 16 shows a simplified process flow of the performance of data center issue prioritization operations implemented in accordance with an embodiment of the invention to prioritize data center issues. In various embodiments, data center issue prioritization operations may be performed in two phases. In various embodiments, phase 1 performs a data center issue grooming operation. As used herein, a data center issue data grooming operation broadly refers to any task, function, procedure, or process performed, directly or indirectly, within a data center monitoring and management environment to prepare the data center issue data for use in the performance of a data center issue prioritization operation. In various embodiments, phase 2 performs a data center issue prioritization operation. In various embodiments, certain data center issue grooming operations may be performed in phase one 1602 to identify a top number of data center issues at a particular point in time (e.g., the top 'n' data center issues at a particular point of time, where the value of 'n' is a matter of design choice). In various embodiments, certain data center issue prioritization operations may likewise be performed in phase two 1604 to prioritize the top 'n' identified data center issues for resolution, or remediation, or both.

In various embodiments, data center issues associated with a particular customer's data center assets are identified in step 1606. In certain of these embodiments, information associated with the customer's identified data center issues is then respectively processed in steps 1608 and 1610 to identify and remove duplicate and similar data center issues. In certain embodiments, Natural Language Processing (NLP) 1612 approaches familiar to skilled practitioners of the art may be used in steps 1608 and 1610 to identify the duplicate and similar data center issues. In certain embodiments, cosine similarity 1614 approaches, likewise familiar to those of skill in the art may be used in step 1610 to identify the similar data center issues.

In various embodiments, the remaining data center issues may be processed in step 1616 to identify and remove those issues that are considered to be of low severity. In certain of these embodiments, low severity data center issues may be identified by calculating a customer impact score for each remaining data center issue, as described in greater detail herein. In certain embodiments, those data center issues having a customer impact score below a certain threshold value may be removed. In these embodiments, the method by which the threshold value is determined, and the method by which the data center issues having a customer impact score below that threshold value are removed, is a matter of design choice.

In certain embodiments, the top 'n' number of data center issues to prioritize is then determined in step 1618. In certain embodiments, the top 'n' number of data center issues to prioritize may be determined by their respective customer impact scores. As an example, eighty seven data center issues may have been identified to prioritize. Of those, ten have a customer impact score of "high," twenty three have a customer impact score of "medium," and the rest have a customer impact score of "low." Accordingly, in this example, the ten data center issues having a customer impact score of "high" may be selected to prioritize. Skilled practitioners of the art will recognize that many such embodiments and examples are possible. Accordingly, the foregoing is not intended to limit the spirit, scope, or intent of the invention.

In various embodiments, the data center issues selected for prioritization may then be processed in step 1620 to calculate their respective probability, as described in greater detail herein, of being able to be remediated or not. In certain of these embodiments, historical data associated with remediating the same, or substantively similar, data center issues may be used to calculate the probability of a particular data center issue being able to be remediated or not. In various embodiments, the data center issues selected for prioritization may then be further processed in step 1622 to calculate the respective payback of being able to be remediated. In certain of these embodiments, historical data associated with remediating the same, or substantively similar, data center issues may be used to calculate the payback of remediating a particular data center issue.

In various embodiments, the value of remediating each of the prioritized data center issues is then calculated in step 1624, as described in greater detail herein. In certain of these embodiments, the data center issues selected for prioritization may be ranked according to the probability of being remediated, their respective remediation payoff score, or their respective remediation value, or a combination thereof. Those of skill in the art will recognize that many such embodiments of such ranking are possible. Accordingly, the foregoing is not intended to limit the spirit, scope or intent of the invention.

Figure 17:
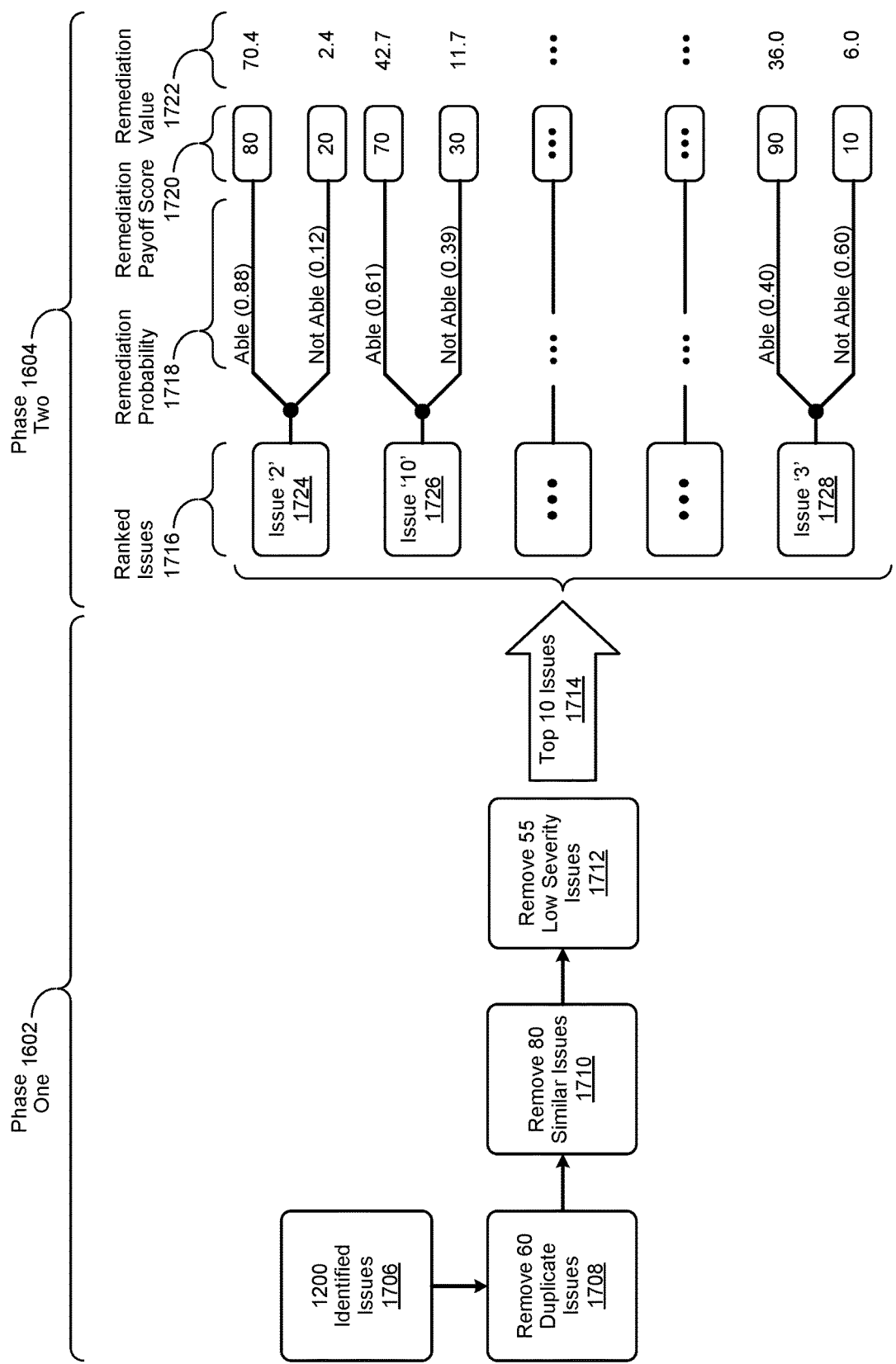
FIG. 17 shows an example process flow of the performance of data center issue prioritization operations to rank the prioritization of data center issues.

FIG. 17 shows an example process flow of the performance of data center issue prioritization operations implemented in a accordance with an embodiment of the invention to rank the prioritization of data center issues. In this embodiment, twelve hundred data center issues associated with a particular customer are identified in step 1706, which are then processed in step 1708 to identify and remove sixty duplicates, as described in greater detail herein. In turn, the de-duplicated data center issues are processed in step 1710 identify and remove fifty similar issues, followed by the remaining data center issues being processed in step 1712 to identify and remove fifty five low severity issues, as likewise described in greater detail herein. Thereafter, the remaining issues are processed in step 1714 to identify the top ten data center issues.

The remaining top ten issues, '2' 1724, '10' 1726, and so forth, through '3' 1728, are then processed in step 1728 to determine their remediation probability, as described in greater detail herein. Their resulting remediation probability scores are then multiplied in step 1720 by their respective remediation payoff score, likewise described in greater detail herein, to generate an associated remediation value 1722. In certain embodiments, the prioritization of the top ten issues, '2' 1724, '10' 1726, and so forth, through '3' 1728 are ranked 1716 according to their respective remediation value 1722 associated with the likelihood of the data center issue being remediated. For example, as shown in FIG. 17, data center issue '2' 1724 has a corresponding remediation value 1722 of '70.4', which is the highest such value, while data center issue '3' 1728 has a corresponding remediation value 1722 of '36', which is the lowest.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a data center monitoring and management operation, comprising:
   monitoring a plurality of data center assets contained within a data center;
   identifying a plurality of data center issues based upon the monitoring;
   performing a data center issue grooming operation, the data center issue grooming operation identifying a number of data center issues from the plurality of data center issues; and
   performing a data center issue prioritization operation, the data center issue prioritization operation prioritizing the number of data center issues from the plurality of data center issues, the prioritizing being for at least one of resolution and remediation and wherein
   the data center issue prioritization operation calculates a probability of being able to remediate each of the number of data center issues from the plurality of data center issues.

2. The method of claim 1, wherein:
   the data center issue grooming operation identifies and removes at least one of duplicate data center issues and similar data center issues.

3. The method of claim 2, wherein:
   the data center issue grooming operation identifies and removes low severity data center issues.

4. The method of claim 1, wherein:
   the data center issue prioritization operation calculates a payback value associated with remediating each of the number of data center issues.

5. The method of claim 4, wherein:
   the data center issue prioritization operation calculates an expected value of remediating each issue, the expected value of remediating each issue being used when prioritizing the number of data center issues.

6. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations and comprising instructions executable by the processor and configured for:
   monitoring a plurality of data center assets contained within a data center;
   identifying a plurality of data center issues based upon the monitoring;
   performing a data center issue grooming operation, the data center issue grooming operation identifying a number of data center issues from the plurality of data center issues; and
   performing a data center issue prioritization operation, the data center issue prioritization operation prioritizing the number of data center issues from the plurality of data center issues, the prioritizing being for at least one of resolution and remediation; and wherein
   the data center issue prioritization operation calculates a probability of being able to remediate each of the number of data center issues from the plurality of data center issues.

7. The system of claim 6, wherein:
   the data center issue grooming operation identifies and removes at least one of duplicate data center issues and similar data center issues.

8. The system of claim 7, wherein:
   the data center issue grooming operation identifies and removes low severity data center issues.

9. The system of claim 6, wherein:
   the data center issue prioritization operation calculates a payback value associated with remediating each of the number of data center issues.

10. The system of claim 6, wherein:
    the data center issue prioritization operation calculates an expected value of remediating each issue, the expected value of remediating each issue being used when prioritizing the number of data center issues.

11. A non-transitory, computer-readable storage medium embodying computer program code, the computer program code comprising computer executable instructions configured for:
    monitoring a plurality of data center assets contained within a data center;
    identifying a plurality of data center issues based upon the monitoring;

performing a data center issue grooming operation, the data center issue grooming operation identifying a number of data center issues from the plurality of data center issues; and performing a data center issue prioritization operation, the data center issue prioritization operation prioritizing the number of data center issues from the plurality of data center issues, the prioritizing being for at least one of resolution and remediation and wherein the data center issue prioritization operation calculates a probability of being able to remediate each of the number of data center issues from the plurality of data center issues.

12. The non-transitory, computer-readable storage medium of claim 11, wherein:
the data center issue grooming operation identifies and removes at least one of duplicate data center issues and similar data center issues.

13. The non-transitory, computer-readable storage medium of claim 12, wherein:
the data center issue grooming operation identifies and removes low severity data center issues.

14. The non-transitory, computer-readable storage medium of claim 11, wherein:
the data center issue prioritization operation calculates a payback value associated with remediating each of the number of data center issues.

15. The non-transitory, computer-readable storage medium of claim 14, wherein the computer executable instructions are further configured for:
the data center issue prioritization operation calculates an expected value of remediating each issue, the expected value of remediating each issue being used when prioritizing the number of data center issues.

16. The non-transitory, computer-readable storage medium of claim 11, wherein:
the computer executable instructions are deployable to a client system from a server system at a remote location.

17. The non-transitory, computer-readable storage medium of claim 11, wherein:
the computer executable instructions are provided by a service provider to a user on an on-demand basis.

* * * * *